US011196263B2

(12) United States Patent
Addepalle et al.

(10) Patent No.: US 11,196,263 B2
(45) Date of Patent: Dec. 7, 2021

(54) SYSTEMS AND METHODS FOR MANAGING ENERGY STORING RESOURCES OF AN ELECTRICAL POWER GRID

(71) Applicant: Midcontinent Independent System Operator, Inc., Carmel, IN (US)

(72) Inventors: Pavan Kumar Addepalle, Carmel, IN (US); Achyuta M. Kandukuri, Carmel, IN (US); Yonghong Chen, Zionsville, IN (US); Kevin Andrew Vannoy, Carmel, IN (US)

(73) Assignee: Midcontinent Independent System Operator, Inc., Carmel, IN (US)

( * ) Notice: Subject to any disclaimer, the term of this patent is extended or adjusted under 35 U.S.C. 154(b) by 0 days.

(21) Appl. No.: 16/684,855

(22) Filed: Nov. 15, 2019

(65) Prior Publication Data
US 2020/0176986 A1 Jun. 4, 2020

Related U.S. Application Data

(60) Provisional application No. 62/773,583, filed on Nov. 30, 2018.

(51) Int. Cl.
*H02J 3/28* (2006.01)
*H02J 3/38* (2006.01)
(Continued)

(52) U.S. Cl.
CPC ............... *H02J 3/28* (2013.01); *G05B 15/02* (2013.01); *H02J 3/381* (2013.01); *H02J 3/001* (2020.01); *H02J 2203/20* (2020.01)

(58) Field of Classification Search
CPC .... H02J 3/28; H02J 3/381; H02J 3/001; H02J 2203/20; H02J 13/00001; H02J 2203/10;
(Continued)

(56) References Cited

U.S. PATENT DOCUMENTS 10,079,317 B2 * 9/2018 Gonatas ................. H02S 10/00
10,509,374 B2 * 12/2019 Parvania .................. G05F 1/66
(Continued)

OTHER PUBLICATIONS

"How Energy Storage Can Participate in New England's Wholesale Electricity Markets"; ISO New England Inc.; White Paper; Mar. 2016; 11 pages.
(Continued)

*Primary Examiner* — Ramesh B Patel
(74) *Attorney, Agent, or Firm* — BakerHostetler

(57) ABSTRACT

The present disclosure pertains to a system that may be configured to operate a power grid, including generation participants, consumers, and electric storage resources (ESRs), by: managing, via the generation participants, a state of charge (SOC) for the ESRs, an operational constraint, minimum and maximum offer parameters, minimum and maximum SOCs, and transition times between charging and discharging, the parameters including charge or discharge time and charge or discharge limits; treating different online modes as a must run commitment status, the modes including discharging, charging, and continuous; and committing an ESR offering an emergency discharge commitment status or an emergency charge commitment status to address a maximum generation emergency condition or a minimum generation emergency condition, respectively.

9 Claims, 5 Drawing Sheets

(51) Int. Cl.
  *G05B 15/02*   (2006.01)
  *H02J 3/00*   (2006.01)
(58) Field of Classification Search
  CPC ......... G05B 15/02; Y02E 60/00; Y02E 40/70;
              Y04S 10/40; Y04S 10/12; Y04S 10/14
  See application file for complete search history.

(56) References Cited

U.S. PATENT DOCUMENTS

| | | | | |
|---|---|---|---|---|
| 2008/0039989 | A1* | 2/2008 | Pollack | B60L 53/57 |
| | | | | 701/22 |
| 2012/0296482 | A1 | 11/2012 | Steven et al. | |
| 2012/0323396 | A1* | 12/2012 | Shelton | H02J 3/381 |
| | | | | 700/297 |
| 2014/0114829 | A1* | 4/2014 | Forbes, Jr. | B60L 53/68 |
| | | | | 705/35 |
| 2014/0172503 | A1* | 6/2014 | Hammerstrom | G06Q 50/06 |
| | | | | 705/7.31 |
| 2014/0336840 | A1* | 11/2014 | Geinzer | G05B 11/00 |
| | | | | 700/297 |
| 2015/0184550 | A1* | 7/2015 | Wichmann | F01K 13/02 |
| | | | | 700/287 |
| 2015/0278968 | A1* | 10/2015 | Steven | G06Q 10/06314 |
| | | | | 705/7.35 |
| 2017/0038786 | A1* | 2/2017 | Asghari | G05F 1/66 |
| 2017/0358041 | A1* | 12/2017 | Forbes, Jr. | H02J 13/0086 |
| 2019/0139159 | A1* | 5/2019 | Sarker | G06Q 30/08 |

OTHER PUBLICATIONS

United States of America Before the Federal Energy Regulatory Commission; Comments of ISO New England Inc.; dated Feb. 13, 2017; 58 pages.
https://www.iso-ne.com/static-assets/documents/2017/04/20170411-webinar-energy-storage.htm; ISO New England Customer Training Disclaimer; accessed Dec. 9, 2019; one page.
"Forward Capacity Market (FCM) Qualification Examples for Storage Technologies"; ISO New England Inc.; Mar. 2018; 11 pages.
"Training Materials"; https://www.iso-ne.com/participate/training/materials/?key-topic=Forward%2520Capacity%2520Market2520Training&eventid=132861 ; ISO New England Inc.; © 2019; accessed Dec. 9, 2019; 3 pages.
Erik Ela; "Reliable, Efficient and Incentive-compatible Solutions for Operating Energy Storage in ISO/RTO Markets"; EPRI Electric Power Research Institute; FERC Technical Conf.; Jun. 2017; 21 pages.
E. Ela; "Independent System Operator and Regional Transmission Organization Energy Storage Market Modeling Working Group White Paper"; No. 3002012327; EPRI Electric Power Research Institute; Mar. 2018; 55 pages.
"The State of Storage—Energy Storage Resources in New York's Wholesale Electricity Markets"; ISO New York Independent System Operator; Dec. 2017; 42 pages.
Whitney Lesnicki; "Energy Storage Market Design Update"; Market Issues Working Group; ISO New York Independent System Operator Jul. 2018; 21 pages.
"Non-Generator Resource (NRG) and Regulation Energy Management (REM)"; Workshop; California ISO; Aug. 2012; 43 pages.
Jason Burwen; "Kicking the Tires on FERC Order 841: Details, Opportunities, and Challenges"; ESA Energy Storage Association; Mar. 2018; 32 pages.
United States of America Before the Federal Energy Regulatory Commission; Comments of the Independent Market Monitor for PJM; dated Feb. 21, 2017; 19 pages.
Laura Walter; "FERC Order on Electric Storage"; PJM; May 2018; 11 pages.
"Electric Storage Resource Participation Model"; Q & A; PJM®; Sep. 2018; 10 pages.
United States of America Before the Federal Energy Regulatory Commission; Comments of Southwest Power Pool, Inc.; no date; 24 pages.
SPP Southwest Power Pool, Inc.; Board of Directors/Members Committee Meeting—Agenda; keyword ESR; Oct. 2018; 35 pages.

\* cited by examiner

ESR Modeling Example of Discharging

ESR Modeling Example of Charging

SYSTEMS AND METHODS FOR MANAGING ENERGY STORING RESOURCES OF AN ELECTRICAL POWER GRID

CROSS-REFERENCE TO RELATED APPLICATIONS

This application claims the benefit of the priority date of U.S. provisional application 62/773,583 filed on Nov. 30, 2018 and entitled "Managing Energy Storing Resources on an Electrical Power Grid," the content of which is incorporated by reference herein in its entirety.

BACKGROUND

An electric storage resource (ESR) may be a resource capable of receiving energy from an electric grid and storing it for later injection of energy back to the electric grid. This definition includes all technologies and/or storage mediums, including batteries, flywheels, compressed air, pumped-hydro, etc. The location of an ESR may be at any point of grid interconnection, on either the interstate transmission system or a local distribution system, and/or behind the meter. Resources that are physically incapable of, or contractually barred from, injecting energy back onto the grid may not qualify as an ESR. Demand response may not qualify as an ESR as it cannot explicitly inject energy back to the grid.

There are many technologies through which energy storage systems can be created. Each of these systems could have their own operating methods that would optimize their operations. Creating a universal method to manage this storage is not an optimal solution and also creating individual management methods per each of these variations is not manageable. There is thus a need for providing a mechanism through which each energy storage system can manage storage, which is optimal to its operation, and participate in the market.

SUMMARY

Systems and methods are disclosed for operating a power grid that includes the grid, power generation participants, power consumers, and electric storage resources (ESRs). Accordingly, one or more aspects of the present disclosure relate to a method for: managing, via the power generation participants, a state of charge (SOC) for the ESRs, an operational constraint, minimum and maximum offer parameters, minimum and maximum SOCs, and transition times between charging and discharging, the offer parameters including charge or discharge time and charge or discharge limits; and treating different online modes as a must run commitment status, the modes including discharging, charging, and continuous. The present disclosure further relates to: committing an ESR offering an emergency discharge commitment status or an emergency charge commitment status to address a maximum generation emergency condition or a minimum generation emergency condition, respectively; and/or providing availability of offline supplemental qualified ESRs offering an available commitment status to provide offline supplemental and to be called upon for commitment in discharge mode in response to a contingency reserve event.

FERC Order 841 requires regional transmission organizations (RTOs) to establish a participation model for ESRs comprising market rules that recognize the physical and operational characteristics of ESRs and that facilitate their participation in energy distribution (i.e., electric grid) markets. The participation model may be required to: (i) ensure that a resource using the participation model may be eligible to provide all capacity, energy, and ancillary services that the resource may be technically capable of providing in the energy distribution markets; (ii) ensure that a resource using the participation model can be dispatched and can set the wholesale market clearing price as both a wholesale seller and wholesale buyer consistent with existing market rules that govern when a resource can set the wholesale price; (iii) account for the physical and operational characteristics of ESRs through bidding parameters or other means; and/or (iv) establish a minimum size requirement for participation in the markets that does not exceed 100 kilowatts (kW). In some embodiments, an ESR may provide offers that range from maximum charge level (as buyer) to maximum discharge level (as a seller). The ESR may either get paid as a seller or may purchase as a buyer based on the dispatch MWs. Additionally or alternatively, the controller that administers the market for electricity producers and users on an electric power grid (the "controller"), such as a regional transmission organization, may be required to specify that the sale of electric energy from the markets to an ESR that the resource then resells back to those markets may be required to be at the wholesale locational marginal price.

The current proposed participation model for ESRs relies on the market participant (MP) managing the SOC as well as other operational characteristics and constraints. The participation model (e.g., commitment status, dispatch status, offer parameters, etc.) disclosed herein may be used by the participants to manage their ESR resource offerings in a way that can optimize the resource storage level that is optimal for the resource operation as well as provide market services that maximize their revenue. Using the disclosed approach, an MP may manage SOC and minimum and maximum bid (offer) parameters, such as charge/discharge time, charge/discharge limits, and/or other operational characteristics (e.g., minimum and maximum SOC, transition times between charging and discharging where applicable, etc.).

The current proposed ESR implements new, storage-specific offer parameters and operating characteristics required by FERC Order 841 and provides eight operating modes to facilitate SOC management and commercial operations. These modes may be indicated via an ESR offer parameter, specifically the commitment status. Valid commitment statuses include: discharge, emergency discharge, charge, emergency charge, continuous, available, not participating, and outage (offline). The three online modes of discharging, charging, and continuous, will be treated as a must run commitment status. The must run commitment status may indicate to an optimization problem that said resource is already committed and is not making an optimal decision on where to pick (e.g., commit) a resource that is optimal for a given condition. The controller may commit an ESR offering an emergency discharge or emergency charge commitment status to address a maximum generation emergency or minimum generation emergency condition, respectively. Offline supplemental qualified ESRs offering an available commitment status may be available to provide offline supplemental and to be called upon for commitment in discharge mode in response to a contingency reserve event. ESRs with a not participating or outage commitment status may not be available to provide any products to the markets.

The method is implemented by a system comprising one or more hardware processors configured by machine-readable instructions and/or other components. The system comprises the one or more processors and other components or media, e.g., upon which machine-readable instructions may be executed. Implementations of any of the described techniques may include a method or process, an apparatus, a device, a machine, a system, or instructions stored on computer-readable storage device(s).

BRIEF DESCRIPTION OF THE DRAWINGS

The details of particular embodiments and implementations are set forth in the accompanying drawings and description below. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Figure 6:
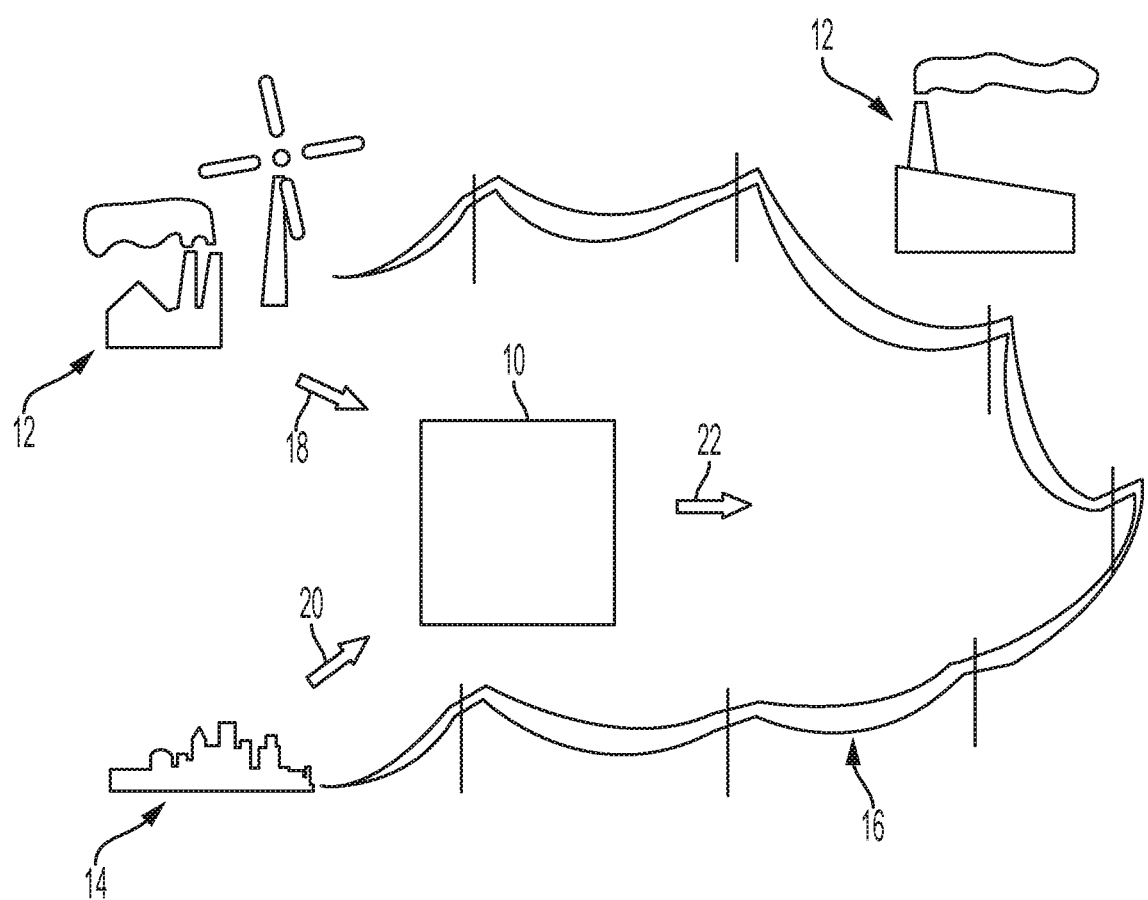
FIG. 6 illustrates an example of a system in which operational characteristics and constraints of electric storage resources (ESRs) are managed, in accordance with one or more embodiments.

FIG. 6 illustrates an example of a system in which operational characteristics and constraints of electric storage resources (ESRs) are managed, in accordance with one or more embodiments. Referring to FIG. 6, an exemplary controller 10, according to the current disclosure, administers the market for electricity producers 12 and users 14 on an electric power grid 16. Some exemplary functions of the controller 10 include monitoring energy transfers on the transmission system, scheduling transmission service, managing power congestion, operating DA and RT energy and operating reserves (OR) markets, and regional transmission planning. In some embodiments, an independent system operator (ISO; also known as a transmission provider) may provide a service for the participants to reserve transmission capacity and utilize the grid capacity in a nonpartisan way (e.g., open access). In these or other embodiments, the ISO operating as a reliability coordinator (RC) may ensure the power is supplied to the grid in a reliable manner. To achieve this reliable power supply, the grid may be operated in a way that under normal or disturbed operating conditions the power is delivered without congestion in the grid (e.g., the system is operated at 85% of the limit). In some embodiments, the regional transmission planning may include expanding and/or modernizing the power grid by adding new or upgraded power system elements to the grid. Certain of the electricity producers 12 may be able to offer combined cycle configurations, which may utilize a combination of physical power producing units such as one or more combustion turbines (CT), steam turbines (ST), DBs, combined cycle, pump storage, batteries, nuclear, hydro (pumped), wind, utility or rooftop photovoltaic (PV), and the like. There may be no minimum run time for wind and solar because these forms of power production may self-schedule.

Both the electricity producers 12 and the users 14 may be considered to be market participants (MPs) as they conduct business within the controller's 10 region. Traditionally, the electricity producers will provide offers 18 of electrical power for the grid 16 and the users will provide bids 20 for power from the grid 16. The controller 10 will process the offers 18 and bids 20 to determine commitments of electrical power and then control the dispatch 22 of electricity on the grid 16 based upon the commitments. These commitments of electrical power may include the resource being offered in with a commitment option (e.g., must run) or being committed by a security-constrained unit commitment (SCUC) process to provide energy and/or operating reserves in the market.

Spinning reserve may be defined as a generation capacity that is on-line but unloaded and that may respond within 10 minutes to compensate for generation or transmission outages. Frequency-responsive spinning reserve responds within 10 seconds to maintain system frequency. Spinning reserves may be the first type used when shortfalls occur. Spinning reserve may alternatively be defined as a specified percentage of contingency reserve that must be synchronized to the system and converted to energy within a deployment period per instruction.

Supplemental reserve may be defined as a generation capacity that may be off-line or that is comprised of a block of curtailable and/or interruptible load and that may be available within 10 minutes. Unlike spinning reserve capacity, supplemental reserve capacity may not be synchronized with the grid (frequency). Supplemental reserves may be used after all spinning reserves are on-line. Supplemental reserve may alternatively be defined as a contingency reserve that is not considered spinning.

Regulating reserve may be defined as a capacity held in reserve by a frequency responsive resource for the purpose of providing regulating reserve deployment in both the up/down direction.

Electric storage resource (ESR) may be defined as a resource capable of receiving energy from the transmission system and storing it for later injection of energy back to the transmission system. This definition includes all technologies and/or storage mediums, including but not limited to, batteries, flywheels, compressed air, and pumped-hydro. The location of an ESR may be at any point of grid interconnection, on either the transmission system or a local distribution system. An ESR may be required to: (i) be capable of injecting and withdrawing a minimum of 0.1 megawatt (MW); (ii) be capable of complying with the transmission provider's setpoint instructions; (iii) have the appropriate metering equipment installed; and/or (iv) be physically located within the controller's balancing authority area.

ESR efficiency factor may be defined as the ratio of discharge energy to charge energy for an ESR.

ESR offer may be defined as an offer submitted by an MP within the controller's balancing authority area for the output of a specified ESR to supply energy, capacity, up ramp capability, down ramp capability, spinning reserve, supplemental reserve, and/or regulating reserve to the energy and OR markets. In some embodiments, MPs may be ESR asset owners.

Emergency maximum energy storage level may be defined as a state of charge (SOC) value that should not be exceeded when an ESR is being charged while providing energy or operating reserves under emergency conditions.

Emergency minimum energy storage level may be defined as an SOC value that should not be exceeded when an ESR is being discharged while providing energy or operating reserves under emergency conditions.

Energy storage level may be defined as the energy, capacity, spinning reserve, supplemental reserve, and/or regulating reserve available to the transmission provider's markets from an ESR.

Hourly charge ramp rate may be defined as the MW/minute response rate for an ESR moving from zero output to its hourly economic maximum charge limit and/or from the hourly economic maximum charge limit to zero output that is utilized in the clearing of the day-ahead (DA) energy and operating reserve (OR) market and all reliability assessment commitment processes, and in responding to either increasing or decreasing setpoint instructions between zero and the hourly economic maximum charge limit that may be submitted to override the default value submitted during the asset registration process.

Hourly discharge ramp rate may be defined as the MW/minute response rate for an ESR moving from zero output to its hourly economic maximum discharge limit and/or from the hourly economic maximum discharge limit to zero output that is utilized in the clearing of the DA energy and OR market and all reliability assessment commitment processes, and in responding to either increasing or decreasing setpoint instructions between zero and the hourly economic maximum discharge limit that may be submitted to override the default value submitted during the asset registration process.

Hourly economic maximum charge limit may be defined as the maximum withdrawal MW level at which an ESR may operate under normal system conditions that may be submitted to override the default value submitted during the asset registration process.

Hourly economic maximum discharge limit may be defined as the maximum injection MW level at which an ESR may operate under normal system conditions that may be submitted to override the default value submitted during the asset registration process.

Hourly economic minimum charge limit may be defined as the minimum withdrawal MW level at which an ESR may operate under normal system conditions that may be submitted to override the default value submitted during the asset registration process.

Hourly economic minimum discharge limit may be defined as the minimum injection MW level at which an ESR may operate under normal system conditions that may be submitted to override the default value submitted during the asset registration process.

Hourly electric storage efficiency factor may be defined as the conversion efficiency factor that indicates the amount of energy injected into the ESR that may be reliably injected back to the transmission system and may be submitted to override the default value submitted during the asset registration process.

Hourly emergency maximum charge limit may be defined as the maximum withdrawal MW level at which an ESR may operate under emergency system conditions that may be submitted to override the default value submitted during the asset registration process.

Hourly emergency maximum discharge limit may be defined as the maximum injection MW level at which an ESR may operate under emergency system conditions that may be submitted to override the default value submitted during the asset registration process.

Hourly emergency minimum charge limit may be defined as the minimum withdrawal MW level at which an ESR may operate under emergency system conditions that may be submitted to override the default value submitted during the asset registration process.

Hourly emergency minimum discharge limit may be defined as the minimum injection MW level at which an ESR may operate under emergency system conditions that may be submitted to override the default value submitted during the asset registration process.

Hourly maximum energy storage level may be defined as the maximum amount of energy that may be stored by a stored energy resource or electric storage resource on a sustained basis, expressed in MW-hour (MWh), that may be submitted to override the default value submitted during the asset registration process. For an ESR, this may be equivalent to the hourly maximum SOC.

Hourly minimum energy storage level may be defined as the minimum amount of energy that may be stored by a stored energy resource or electric storage resource on a sustained basis, expressed in MWh, that may be submitted to override the default value submitted during the asset registration process. For an ESR this is equivalent to the hourly minimum SOC.

Hourly regulation maximum charge limit may be defined as the maximum withdrawal MW level at which an ESR may respond to automatic control signals, that may be submitted to override the default value submitted during the asset registration process.

Hourly regulation maximum discharge limit may be defined as the maximum injection MW level at which an ESR may respond to automatic control signals, that may be submitted to override the default value submitted during the asset registration process.

Hourly regulation minimum charge limit may be defined as the minimum withdrawal MW level at which an ESR may respond to automatic control signals, that may be submitted to override the default value submitted during the asset registration process.

Hourly regulation minimum discharge limit may be defined as the minimum injection MW level at which an ESR may respond to automatic control signals, that may be submitted to override the default value submitted during the asset registration process.

Initial energy storage level may be defined as the energy, capacity, spinning reserve, supplemental reserve, and/or regulating reserve available from an ESR at the start of the DA energy and OR market.

Maximum energy storage level may be defined as an SOC value that should not be exceeded when an ESR is being charged while providing energy or operating reserves under normal operating conditions.

Minimum energy storage level may be defined as an SOC value that should not be exceeded when an ESR is being discharged while providing energy or operating reserves under normal operating conditions.

Some physical or operational characteristics will now be defined.

State of charge (SOC) may be defined as energy, capacity, spinning reserve, supplemental reserve, and/or regulating reserve available to the transmission provider's markets from an ESR. The SOC may be represented in MWh and telemetered using ICCP as specified in BPM-031 for ICCP data requirement.

Initial energy storage level may be defined as the energy, capacity, spinning reserve, supplemental reserve, and/or regulating reserve available from an ESR at the start of day-ahead energy and operating reserve market.

Maximum energy storage level may be defined as an SOC value that should not be exceeded when an ESRs is being charged while providing energy or operating reserves under normal operating conditions when a resource using the participation model is receiving electric energy from the grid (expressed in MWh).

Minimum energy storage level may be defined as an SOC value that should not be exceeded when an ESRs is being discharged while providing energy or operating reserves under normal operating conditions when a resource using the participation model is injecting electric energy to the grid (e.g., 5% SOC).

Emergency maximum energy storage level may be defined as a maximum SOC above which, during emergency system conditions, the resource may be dispatched. The emergency maximum energy storage level may be a state of charge value that should not be exceeded when an ESRs is being charged while providing energy or operating reserves under emergency conditions.

Emergency minimum energy storage level may be defined as a minimum SOC below which, during emergency system conditions, the resource may be dispatched. The emergency minimum energy storage level may be an SOC value that should not be exceeded when an ESR is being discharged while providing energy or operating reserves under emergency conditions.

Economic maximum charge limit may be defined as a maximum charge limit that represents the maximum MW quantity of electric energy that a resource using the participation model for ESRs may receive from the grid.

Economic maximum discharge limit may be defined as a maximum discharge limit that represents the maximum MW quantity that a resource using the participation model for ESRs may inject to the grid.

Minimum charge time may be defined as a minimum charge time that represents the shortest duration that a resource using the participation model for ESRs is able to be dispatched by the regional transmission organization (RTO)/ISO to receive electric energy from the grid (e.g., one hour).

Maximum charge time may be defined as a maximum charge time that represents the maximum duration that a resource using the participation model for ESRs is able to be dispatched by the RTO/ISO to receive electric energy from the grid (e.g., four hours).

Minimum run time may be defined as a minimum run time that represents the minimum amount of time that a resource using the participation model for ESRs is able to inject electric energy to the grid (e.g., one hour).

Maximum run time may be defined as a maximum run time that represents the maximum amount of time that a resource using the participation model for ESRs is able to inject electric energy to the grid (e.g., four hours).

Economic minimum discharge limit may be defined as the minimum MW output level that a resource using the participation model for ESRs may inject onto the grid.

Economic minimum charge limit may be defined as the minimum MW level that a resource using the participation model for ESRs may receive from the grid.

Discharge ramp rate may be defined as the speed at which a resource using the participation model for ESRs may move from zero output to its maximum discharge limit or from maximum discharge limit to zero output.

Charge ramp rate may be defined as the speed at which a resource using the participation model for ESRs may move from zero output to its maximum charge limit or from maximum charge limit to zero output.

Electric storage efficiency factor (0 to 1) may be defined as a portion of energy injected into the ESR that may be reliability injected back to the grid. The electric storage efficiency factor (0 to 1) may indicate the efficiency of the storage resource to convert the input to output.

Regulation maximum charge limit may be defined as the maximum withdrawal MW level at which an ESR may respond to automatic control signals.

Regulation minimum charge limit may be defined as the minimum withdrawal MW level at which an ESR may respond to automatic control signals.

Regulation maximum discharge limit may be defined as the maximum injection MW level at which an ESR may respond to automatic control signals.

Regulation minimum discharge limit may be defined as the minimum injection MW level at which an ESR may respond to automatic control signals.

Emergency minimum charge limit may be defined as the minimum withdrawal MW level at which an ESR may operate under emergency system conditions.

Emergency maximum charge limit may be defined as the maximum withdrawal MW level at which an ESR may operate under emergency system conditions.

Emergency minimum discharge limit may be defined as the minimum injection MW level at which an ESR may operate under emergency system conditions.

Emergency maximum discharge limit may be defined as the maximum injection MW level at which an ESR may operate under emergency system conditions.

Initial energy storage level may be defined as the energy, capacity, spinning reserve, supplemental reserve, and/or regulating reserve available from an ESR at the start of day-ahead energy and operating reserve market.

Self-scheduled may be defined as a specific amount of energy, OR, and/or capacity to be supplied from a specific resource or planning resource as a price taker. A resource may be a price taker, e.g., when the price of the inject point where the resource is going to sell power is derived due to the offers of the other resources.

Controller 10 of FIG. 6 may comprise electronic storage. Electronic storage of the system may comprise media that electronically stores information. The electronic storage media may comprise system storage that is provided integrally (i.e., substantially non-removable) with the system and/or removable storage that is removably connectable to the system via, for example, a port (e.g., a USB port, a firewire port, etc.) or a drive (e.g., a disk drive, etc.). The electronic storage may be (in whole or in part) a separate component within the system, or the electronic storage may be provided (in whole or in part) integrally with one or more other components of the system (e.g., a user interface device, the processor, etc.). In some embodiments, the electronic storage may be located in a server together with the processor, in a server that is part of the external resources, in the user interface devices, and/or in other locations. The electronic storage may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. The electronic storage may store software algorithms, information obtained and/or determined by the processor, information received via the user interface devices and/or other external computing systems, information received from the external resources, and/or other information that enables the system to function, as described herein.

Controller 10 may further comprise external resources. External resources of the system may include sources of information (e.g., databases, websites, etc.), external entities participating with the system, one or more servers outside of the system, a network, the electronic storage, equipment related to Wi-Fi technology, equipment related to Bluetooth® technology, data entry devices, a power supply, a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to the external resources may be provided by other components or resources included in the system. The processor, the external resources, the user interface device, the electronic storage, a network, and/or other components of the system may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

Controller 10 may further comprise user interface device(s). The user interface device(s) of the system may be configured to provide an interface between one or more users and the system. The user interface devices may be configured to provide information to and/or receive information from the one or more users. The user interface devices include a user interface and/or other components. The user interface may be and/or include a graphical user interface configured to present views and/or fields configured to receive entry and/or selection with respect to particular functionality of the system, and/or provide and/or receive other information. In some embodiments, the user interface of the user interface devices may include a plurality of separate interfaces associated with the processors and/or other components of the system. Examples of interface devices suitable for inclusion in the user interface device include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that the user interface devices include a removable storage interface. In this example, information may be loaded into the user interface devices from removable storage (e.g., a smart card, a flash drive, a removable disk) that enables users to customize the implementation of the user interface devices.

In some embodiments, the user interface devices may be configured to provide a user interface, processing capabilities, databases, and/or electronic storage to the system. As such, the user interface devices may include the processors, the electronic storage, the external resources, and/or other components of the system. In some embodiments, the user interface devices may be connected to a network (e.g., the Internet). In some embodiments, the user interface devices do not include the processor, the electronic storage, the external resources, and/or other components of the system, but instead communicate with these components via dedicated lines, a bus, a switch, network, or other communication means. The communication may be wireless or wired. In some embodiments, the user interface devices may be laptops, desktop computers, smartphones, tablet computers, and/or other user interface devices.

Data and content may be exchanged between the various components of the system through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

Controller 10 may further comprise a processor. In some embodiments, the processor may belong to a user device, a consumer electronics device, a mobile phone, a smartphone, a personal data assistant, a digital tablet/pad computer, a wearable device (e.g., watch), a personal computer, a laptop computer, a notebook computer, a work station, a server, a high performance computer (HPC), a vehicle computer, a game or entertainment system, a set-top-box or any other device. As such, the processor is configured to provide information processing capabilities in the system. The processor may comprise one or more of a digital processor, an analog processor, a digital circuit designed to process information, an analog circuit designed to process information, a state machine, and/or other mechanisms for electronically processing information. Although the processor may be a single entity, this is for illustrative purposes only. In some embodiments, the processor may comprise a plurality of processing units. These processing units may be physically located within the same device (e.g., a server), or the processor may represent processing functionality of a plurality of devices operating in coordination (e.g., one or more servers, the user interface devices, devices that are part of the external resources, the electronic storage, and/or other devices).

Generally, FERC Order 841 requires regional transmission organizations (RTOs) to establish a participation model for electric storage resources (ESRs) comprising market rules that recognize the physical and operational characteristics of ESRs, and facilitate their participation in RTO markets. The participation model may be required to: (i) ensure that a resource using the participation model is eligible to provide all capacity, energy, and ancillary services that the resource is technically capable of providing in the RTO markets; (ii) ensure that a resource using the participation model may be dispatched and may set the wholesale market clearing price as both a wholesale seller and wholesale buyer consistent with existing market rules that govern when a resource can set the wholesale price; (iii) account for the physical and operational characteristics of ESRs through bidding parameters or other means; and/or (iv) establish a minimum size requirement for participation in the RTO markets that does not exceed 100 kW. Additionally, the RTO may be required to specify that the sale of electric energy from the RTO markets to an ESR that the resource then resells back to those markets may be required to be at the wholesale locational marginal price.

As required by FERC Order 841, an ESR may be a resource capable of receiving electric energy from the grid and storing it for later injection of electric energy back to the grid, regardless of its storage medium. An ESR may be located on the interstate transmission system, a distribution system, or behind the meter. This definition may exclude a resource that is either physically incapable of injecting electric energy back onto the grid due to its design or configuration or contractually barred from injecting electric energy back onto the grid. An ESR providing RTO wholesale services may set the wholesale market-clearing price as both a wholesale seller and wholesale buyer and may be compensated in the same manner as other resources that provide the same services.

The current ESR participation model may allow ESRs to participate in the RTO/ISO markets in a way that recognizes their unique physical and operational characteristics. The current participation model for ESRs relies on the market participant (MP) managing the state of charge (SOC) as well as other operational characteristics and constraints. The model accommodates bid (offer) parameters required by FERC Order 841 and provides eight commitment statuses (or modes): discharge, emergency discharge, charge, emergency charge, continuous, available, not participating, and outage (offline). In some embodiments, an energy storage system may transition from one mode of operation to another based on the resource needs and market needs through the given commit options to the participant.

To meet the requirements of FERC Order 841 with current market system resource commitment and dispatch capabilities, the three online and dispatchable modes, discharging, charging, and continuous, will be treated as a must run commitment status. The controller may commit an ESR offering an emergency discharge or emergency charge commitment status to address a maximum generation emergency or minimum generation emergency condition, or other declared transmission emergency. Offline supplemental qualified ESRs offering the available commitment status are available to provide offline supplemental and to be called upon for commitment in discharge mode in response to a contingency reserve event. An event is called a contingency reserve event if contingency reserve deployments (e.g., deployment of spinning and supplemental reserves) occur in response to a system event like sudden loss of generation or inter-change. ESRs with a not participating or outage commitment status may not be available to provide any RTO/ISO market products.

This disclosure allows the MP to manage SOC, as well as manage minimum and maximum offer parameters such as charge/discharge time, charge/discharge limits, and other operational characteristics such as minimum and maximum SOC and transition times between charging and discharging where applicable. This participation model may need to relax some of the offer parameters on a priority basis to resolve infeasible or conflicting offers (for example min and/or max runtimes if the commit status changes before these limits could be met).

Some embodiments of market and system operations are provided as examples. Resources meeting the FERC Order 841 definition of ESRs may choose to participate in RTO markets as a new resource type, electric storage resource (ESR). In the controller's energy and operating reserves markets, ESR offers will be referred to as offers for both positive (discharging) and negative (charging) energy; offers related to negative ESR generation (or purchases) will not be referred to as bids in this document.

As a part of the offers for ESR type resources, the MP may select a commitment status reflecting one of the following ESR modes of operation: discharge, emergency discharge, charge, emergency charge, continuous, available, not participating, and outage (offline). The controller's day-ahead (DA) market, forward reliability assessment commitment (FRAC), reliability assessment commitment (RAC), look ahead commitment (LAC), and unit dispatch system (UDS) may use offer parameters reflecting the participant's specified mode of operation to clear the ESR. Table 1 summarizes key operating parameters for each commitment status. Some different ESR commitment statuses may be characterized, as follows.

TABLE 1

| MODE: DISCHARGE/EMERGENCY DISCHARGE | MODE: CHARGE/EMERGENCY CHARGE |
|---|---|
| Max Limit: Maximum Discharge Limit | Max Limit: Minimum Charge Limit |
| Min Limit: Minimum Discharge Limit | Min Limit: Maximum Charge Limit |
| Ramp Rate: Discharge Ramp Rate | Ramp Rate: Charge Ramp Rate |
| State of Charge Constraint: | State of Charge Constraint: |
| Minimum State of Charge | Maximum State of Charge |
| MODE: CONTINUOUS OPERATION | MODE: AVAILABLE |
| Max Limit: Maximum Discharge Limit | Max Limit: Maximum Offline Response |
| Min Limit: Maximum Charge Limit | Limit for Off-line Supplemental Reserve |
| Ramp rate = Dispatch MW > 0 ? Discharge | State of Charge Constraint: |
| Ramp Rate: Charge Ramp Rate | Minimum State of Charge |
| State of Charge Constraint: | EMERGENCY DISCHARGE |
| Minimum State of Charge and | |
| Maximum State of Charge | |
| MODE: NOT PARTICIPATING | MODE: OUTAGE |
| N/A | N/A |

Some aspects of the discharge ESR commitment status (mode) will now be described. Resources using the ESR model and submitting a discharge commitment status will be treated similar to generation resources and be dispatched by the DA market and unit dispatch system (UDS) for energy and/or cleared for on-line ancillary services between its economic minimum discharge limit and economic maximum discharge limit when not selected for regulation or emergency limit use. Like generation resources, if selected for regulation, the regulation minimum discharge limit and regulation maximum discharge limit may be the applied ESR limits.

Figure 1:
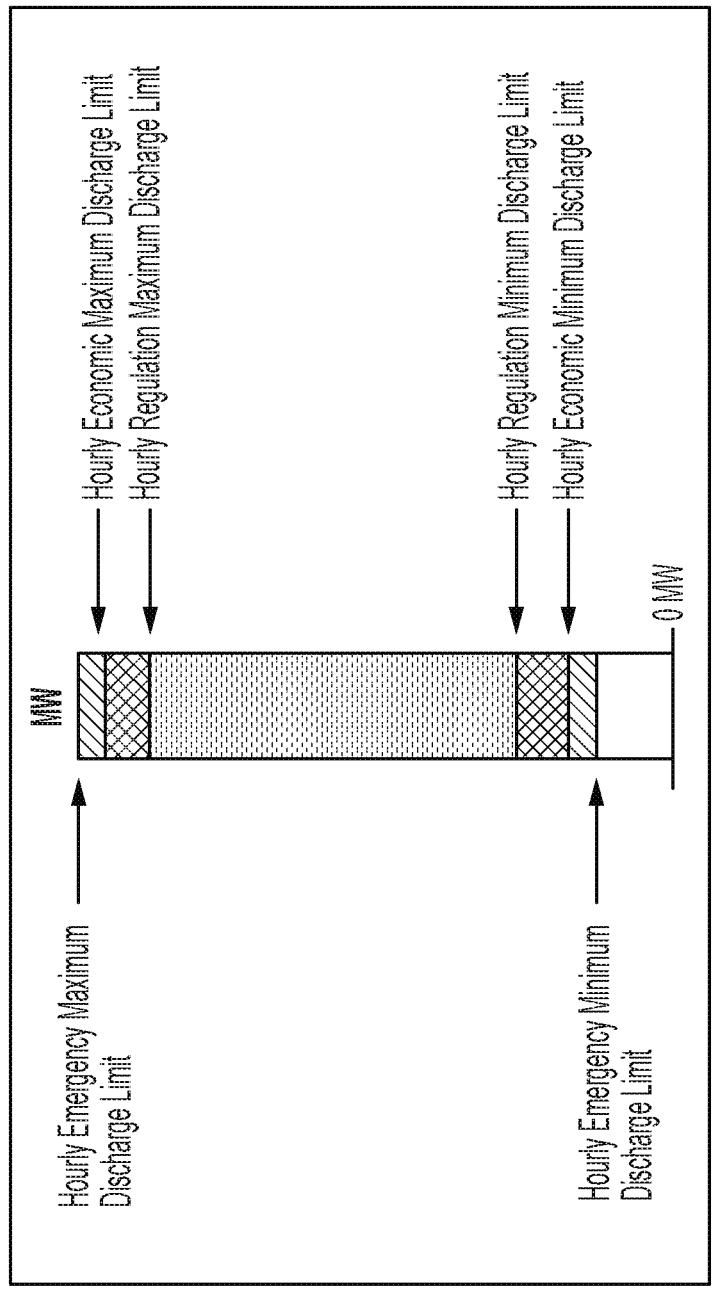
FIG. 1 illustrates a required relationship between power limits for a discharge commitment status, in accordance with one or more embodiments.

FIG. 1 illustrates a required relationship between power limits for a discharge commitment status, in accordance with one or more embodiments. Regulation discharge limits may be within (or equal to) economic discharge limits. Economic discharge limits may be within (or equal to) emergency discharge limits. Emergency minimum discharge limit may be greater than or equal to zero MW.

Some aspects of the unit commitment with respect to the discharge mode will now be described. The DA market commitment, forward reliability assessment commitment (FRAC), reliability assessment commitment (IRAC), and look ahead commitment (LAC) processes will treat ESRs with a discharge commitment status similar to must run commitment status for generation resources. The MP may be responsible for maintaining the SOC. The MP may further be responsible for respecting minimum and maximum run time offer parameters and other operational characteristics, similar to other must run resources. ESRs in discharge commitment status that are qualified for regulation and offered with regulation reserve dispatch status of economic may be regulation committed in SCUC at zero MW. In some embodiments, an ISO may use an automatic generation control (AGC) system to calculate, at 4 second intervals, each resource setpoint. Setpoints are made up of base points (e.g., an energy value calculated for a 5 minute interval) and deployed reserves (e.g., including regulating reserves). The reserves deployments values may be calculated, e.g., every 4 seconds, to balance the system. An ESR that can respond to the setpoint instruction may change frequently, providing such a service to the system and getting compensated for that service. ESRs in discharge commitment status offered with energy dispatch status of economic may be cleared at economic minimum discharge limit in SCUC.

A DA commitment process of an independent system operator (ISO) may be unable to and may not enforce SOC limits during the unit commitment analysis and may therefore apply conservative assumptions for ESR contributions when making market-wide commitment decisions. Related aspects are described in relation to ESRs' commitment and dispatch, as follows.

Some aspects of the energy clearing rules with respect to the discharge mode will now be described. The DA market may clear an ESR's energy at its economic minimum discharge limit (or at a level required by self-scheduled products when they are specified) plus additional volumes based on its economic energy offer parameters and impact on transmission and resource constraints, including the new SOC limits associated with an ESR. A DA market may clear the MW volume for a resource for each hour. The actual dispatch and deployment may occur in the real-time (RT) market. RT UDS may determine the ESR energy basepoint for the resource at its economic minimum discharge limit plus additional volumes based on its economic offer and transmission and resource constraints, including the SOC limits.

Some aspects of the ramp capability product clearing rules with respect to the discharge mode will now be described. ESRs may be eligible to clear up ramp product and/or down ramp product based on commitment and dispatch status, economic energy offer curves, and available dispatch using rules similar to generation resources.

Some aspects of the operating reserve (OR) clearing rules with respect to the discharge mode will now be described. ESRs may be eligible to clear regulating, spinning, and/or supplemental reserve products based on qualification, participation, economic offers, available dispatch, and other constraints, including the new SOC limits associated with an ESR. The deployment of regulation and on-line contingency reserves may be communicated by ICCP along with the resource setpoint using the same approach applied to generation resources. To clear OR, there should be enough energy storage level in the ESR to support the deployment of such reserves for at least one hour, per the Tariff. In some embodiments, an ISO may be subject to a Tariff, which may provide market rules for the resources participating in the market to follow. Per the rules provided in the Tariff, any type of resources that provide operating reserves may provide them for a certain length (e.g., one hour). The entire contents of a most recent Tariff are incorporated herein by reference. Clearing ORs may not impact hour ending energy storage level in DA energy and OR market. ESRs may be eligible to provide all reserve products (e.g., regulating, spinning, supplemental reserves, etc.) to the market.

Some aspects of the emergency discharge ESR commitment status (mode) will now be described. While the discharge commitment status may be treated similar to a must run commitment status, ESR's offering the emergency discharge status may be available for commitment by the controller to assist with identified emergency conditions. Emergency discharge ESR commitments may not conform to all offered commitment parameters for the initial implementation, which may be described in relation to ESR SOC constraints, as follows.

Some aspects of the charge ESR commitment status (mode) will now be described. Once committed, any ESR in emergency discharge commitment status may be dispatched the same as an ESR with a discharge commitment status. Resources using the ESR model and submitting a charge commitment status may be dispatched for energy and/or cleared for ancillary services between its economic minimum charge limit and economic maximum charge limit when not selected for regulation or emergency limit use. If selected for regulation, the regulation minimum charge limit and regulation maximum charge limit may be the applied ESR limits. During system emergency conditions, the ESR's emergency minimum charge limit and/or emergency maximum charge limit may be used.

Figure 2:
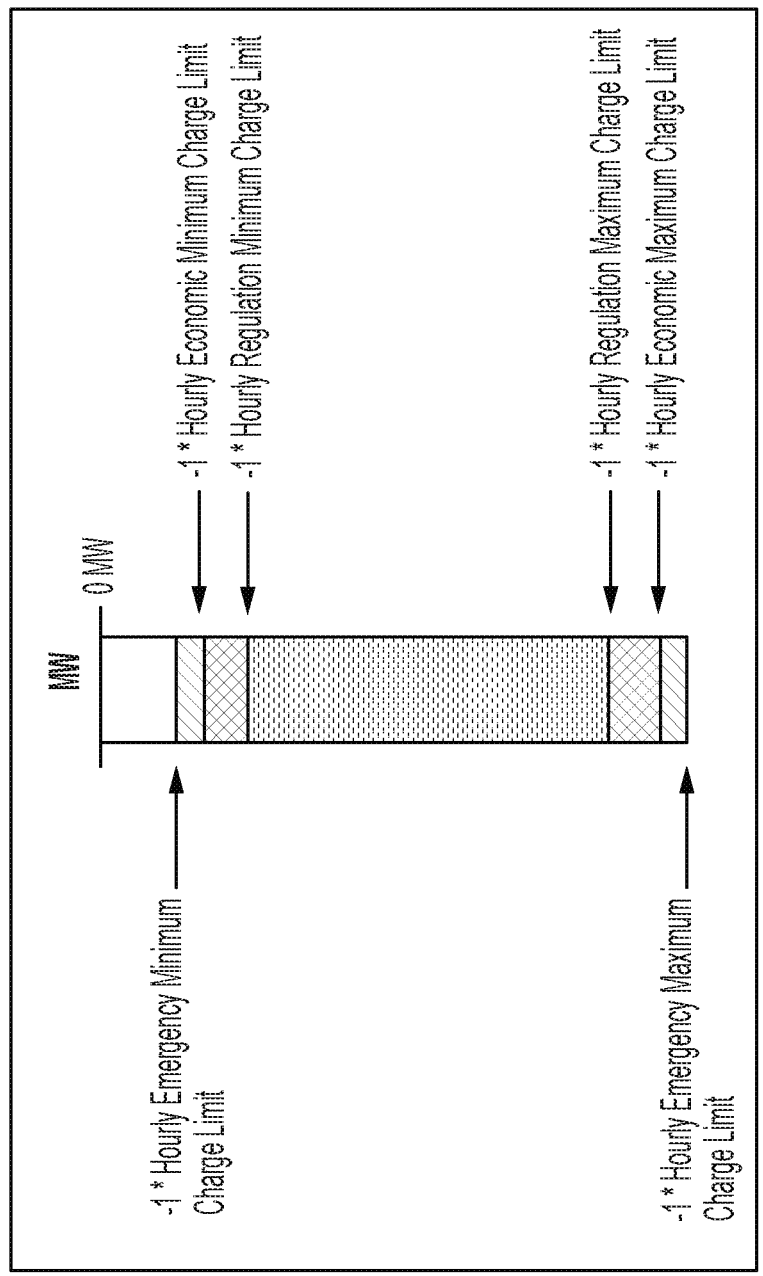
FIG. 2 illustrates a required relationship between power limits for a charge commitment status, in accordance with one or more embodiments.

FIG. 2 illustrates a required relationship between power limits for a charge commitment status, in accordance with one or more embodiments. Regulation charge limits may be within (or equal to) economic charge limits. Economic charge limits may be within (or equal to) emergency charge limits. Emergency maximum limit may be less than or equal to zero MW.

In charge status the applied limits may be negative so offer data may be multiplied by negative one for intervals with a charge commitment status. The MP may be responsible for maintaining the SOC.

Some aspects of the unit commitment with respect to the charge mode will now be described. The DA market commitment, forward reliability assessment commitment (FRAC), reliability assessment commitment (IRAC), and look ahead commitment (LAC) processes will treat ESRs with charge commitment status similar to must run commitment status for generation resources. The MP may be responsible for respecting minimum and maximum run time and down time offer parameters and other operational characteristics, similar to other must run resources. ESRs in charge mode that are qualified for regulation and offered with regulation reserve dispatch status of economic may be regulation committed in SCUC at zero mw. ESRs in charge commitment status offered with energy dispatch status of economic may be cleared at economic minimum charge limit in SCUC.

An ISO's DA commitment process may be unable to and may not enforce SOC limits during the unit commitment analysis and may therefore apply conservative assumptions ESR contributions when making market-wide commitment decisions. Related aspects are described in relation to ESRs' commitment and dispatch, as follows.

Some aspects of the energy clearing rules with respect to the charge mode will now be described. The DA market may clear an ESR's energy at its economic minimum charge limit (or at a level required by self-scheduled products when they are specified) plus additional charging volumes based on its economic energy offer curve parameters and impact to transmission and resource constraints, including the new SOC limits associated with an ESR. RT UDS may determine the ESR energy basepoint at its economic minimum charge limit plus additional charging volumes based on its economic energy offer curve and transmission and resource constraints, including the SOC limits. In some embodiments, self-scheduling may be an option available to ESR to offer in a fixed MW value to manage their resource level.

Some aspects of the ramp capability product clearing rules with respect to the charge mode will now be described. ESRs may be eligible to clear up ramp product and/or down ramp product based on participation, economic offers, and available dispatch. Since charging withdraws energy from the network, up ramp capability (URC) may be accounted for between the energy dispatch and the applicable minimum charging limit, and down ramp capability (DRC) may be accounted for between the energy dispatch and the applicable maximum charging limit.

Some aspects of the OR clearing rules with respect to the charge mode will now be described. ESRs may be eligible to clear regulating, spinning, and/or supplemental reserve products based on qualification, participation, economic offers, available dispatch, and other constraints, including the new SOC limits associated with an ESR. Like URC, when the ESR is charging contingency reserve is accounted for between the energy dispatch and the applicable minimum charging limit. The deployment of regulation and on-line contingency reserves may be communicated by ICCP along with the resource set point using the same approach applied to generation resources, except that the ESR setpoint may be negative while the ESR is charging. To clear OR there should be enough energy storage level in the ESR to support the deployment of such reserves. Clearing ORs may not impact hour ending energy storage level in DA energy and OR market.

Some aspects of the emergency charge ESR commitment status (mode) will now be described. While the charge commitment status may be treated similar to a must run commitment status, ESR's offering the emergency charge status may be available for commitment by the controller to assist with identified emergency conditions. Emergency charge ESR commitments may not conform to all offered commitment parameters for the initial implementation, which may be described in relation to ESR SOC constraints, as follows. Once committed, any ESR with an emergency charge commitment status may be dispatched the same as an ESR with a charge commitment status.

Some aspects of the continuous ESR commitment status (mode) will now be described. Resources using the ESR model and submitting a continuous commitment status may be dispatched for energy and may be cleared for ORs between its economic maximum discharge limit and economic maximum charge limit when not selected for regulation or emergency limits. With this status, the ESR may move continuously between charging and discharging within the market interval (e.g., regulation deployments may result in the ESR setpoint crossing zero within seconds). If selected for regulation, the regulation maximum charge limit and regulation maximum discharge limit may be the applied ESR limits. During system emergency conditions, the ESR's emergency maximum charge limit and/or emergency maximum discharge limit may be used.

Figure 3:
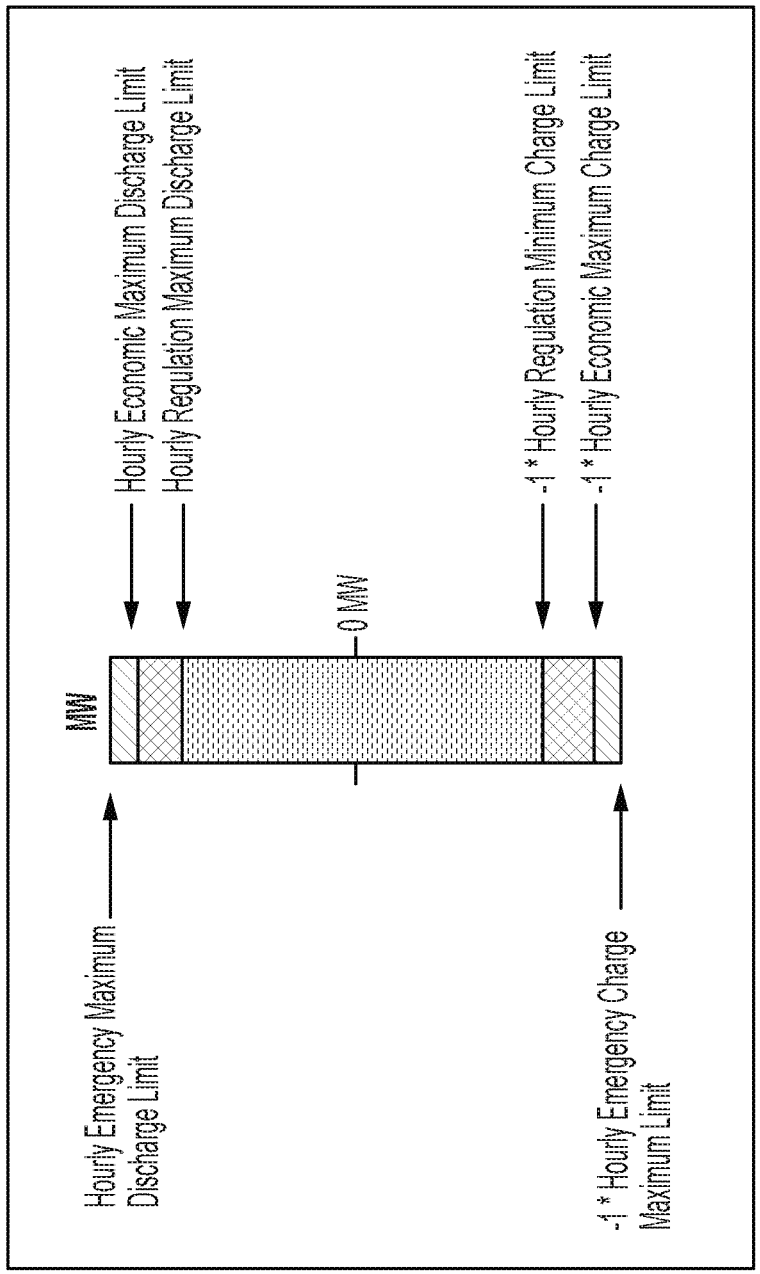
FIG. 3 illustrates a required relationship between power limits for a continuous commitment status, in accordance with one or more embodiments.

FIG. 3 illustrates a required relationship between power limits for a continuous commitment status, in accordance with one or more embodiments. Regulation maximum charge limit and regulation discharge maximum limit may be within (or equal to) the range between the economic maximum charge limit and the economic maximum discharge limit. The range between the economic maximum charge limit and the economic maximum discharge limit may be within (or equal to) emergency maximum charge limit and emergency maximum discharge limit. Emergency maximum charge limit may be greater than or equal to zero MW. Emergency maximum discharge limit may be greater than or equal to zero MW.

In continuous commitment status, the economic maximum charge limit, regulation maximum charge limit, economic maximum charge limit, and regulation minimum charge limit may be entered as positive numbers and automatically multiplied by a negative one. In continuous commitment status economic minimum charge limits and economic minimum discharge limits are not used in market dispatch. The MP may be responsible for maintaining the SOC.

Some aspects of the market energy offers with respect to the continuous mode will now be described. The ESR provides a single incremental energy offer curve up to ten segments which ranges across the continuously dispatchable range from corresponding economic maximum charge limits (the negative resource minimum) value to a corresponding economic maximum discharge limits (the positive resource maximum) value with increasing incremental energy costs (which may be negative for a portion or all of the curve).

Some aspects of the unit commitment with respect to the continuous mode will now be described. The DA market commitment, forward reliability assessment commitment (FRAC), reliability assessment commitment (IRAC), and look ahead commitment (LAC) processes may treat ESRs with continuous commitment status similar to must run commitment status resources. The MP may be responsible for respecting minimum and maximum run time and down time offer parameters and other operational characteristics, similar to other must run resources. A continuous commitment status ESR may be considered online including times when its energy is scheduled to zero MW. ESRs in continuous commitment status that are qualified for regulation and offered with regulation reserve dispatch status of economic may be regulation committed in SCUC at zero MW. ESRs in continuous commitment status offered with energy dispatch status of economic may be cleared at zero MW in SCUC.

The controller's DA commitment process may be unable to and may not enforce SOC limits during the unit commitment analysis and may therefore apply conservative ESR contributions when making market-wide commitment decisions. Related aspects are described in relation to ESRs' commitment and dispatch, as follows.

Some aspects of the energy clearing rules with respect to the continuous mode will now be described. With a continuous commitment status, an ESR may have zero energy dispatched. The DA market may clear an ESR's energy at zero (or at a level required by self-scheduled products when they are specified) plus additional volumes based on its economic energy offer curve parameters and impact to transmission and resource constraints, including the new SOC limits associated with an ESR. RT UDS may determine the ESR energy basepoint at zero (or at a level required by self-scheduled products when they are specified) plus additional charging or discharging volumes based on its economic energy offer curve and transmission and resource constraints, including the SOC limits.

Some aspects of the ramp capability product clearing rules with respect to the continuous mode will now be described. ESRs may be eligible to clear up ramp product and/or down ramp product based on participation, economic offers, and available dispatch. URC and DRC may be cleared continuously across zero ESR output when the ESR is in continuous commitment status.

Some aspects of the OR clearing rules with respect to the continuous mode will now be described. Resources eligible to clear regulating, spinning, and/or supplemental reserve products based on qualification, participation, economic offers, available dispatch, and other constraints including the new SOC limits associated with an ESR. ORs may be cleared continuously across zero ESR output when the ESR is in continuous commitment status. The deployment of regulation and on-line contingency reserves may be communicated by ICCP along with the resource set point using the same approach applied to generation resources, except that the ESR setpoint may be negative while the ESR is charging.

Some aspects of the available ESR commitment status (mode) will now be described. Resources using the ESR model and submitting an available commitment status may be indicating that the resource is offline and available for providing only offline products. If qualified to provide offline products (i.e., offline supplemental reserve), the ESR's offline products may be cleared when economic as determined by the ESR's economic offer parameters and feasible within the applicable constraints. If called on to deploy the cleared product, the ESR may come online and discharge at the required level within the appropriate time. Because the ESR may come online to discharge, the remainder of its submitted offer parameters may be required to be compatible with discharge operations in any interval in which the available commitment status is submitted. An ESR's offline reserve deployment compliance may be evaluated using the same rules applied to generation resources.

The MP may be responsible for maintaining the SOC. The MP may be also responsible for respecting minimum and maximum run time and down time offer parameters and other operational characteristics.

Some aspects of the not participating ESR commitment status (mode) will now be described. Resources using the ESR model and submitting a not participating commitment status may not be available for clearing any market products.

An ESR with an RT not participating commitment status without a planned commitment but having real-time (RT) telemetry indicating that the ESR is online will be treated similar to generation resources with this type of conflicting data—the ESR's RT setpoint may echo back its RT output. The MP may be responsible for maintaining the SOC, and respecting other offer parameters or operating characteristics.

Some aspects of the outage (offline) ESR commitment status (mode) will now be described. Resources using the ESR model and submitting an outage commitment status may not be available for clearing any market products. Similar to other resource types, ESRs submitting outages through the outage scheduler will be treated the same as the outage commitment status regardless of the ESR's submitted commitment status.

An ESR being treated as having an RT outage commitment status without a planned commitment but having RT telemetry indicating that the ESR is online will be treated similar to generation resources with this type of conflicting data—the ESR's RT setpoint may echo back its RT output. The MP may be responsible for maintaining the SOC, and respecting other offer parameters or operating characteristics.

Some aspects of the contemplated modeling and registration will now be discussed.

Presently provided are some minimum sizes. For example, FERC Order 841 has restricted RTO/ISOs from imposing a minimum size requirement greater than 100 kW (0.1 MW). That is, ESRs offering as small as 100 kW may be allowed to participate in the RTO/ISO markets. This 0.1 MW minimum may include both capacity and any offers to sell or buy in the market. The size requirement may apply to all ESRs and may not be technology or location-specific.

Some aspects of the network and commercial modeling will now be described. ESRs may be defined as generation assets per FERC Order 841. Within an ISO's commercial modeling structure, all generation asset commercial pricing nodes (CPNodes) may be required to have a one-to-one relationship to elemental pricing nodes (EPNodes). Therefore, ESRs may be modeled as a single generation resource (EPNode) in the controller's operating and commercial models.

Some aspects of the distributed (distribution connected) storage will now be described. In general, the controller models only the transmission system and models distribution network as lower voltage load. If an ESR does not explicitly inject onto a transmission system bus, then it may be assumed to reside within an existing load modeled within the controller. When an ESR is connected at the distribution level, the ESR EPNode may be placed at the same bus as the load which is modeled to represent that part of the distribution network.

Figure 4:
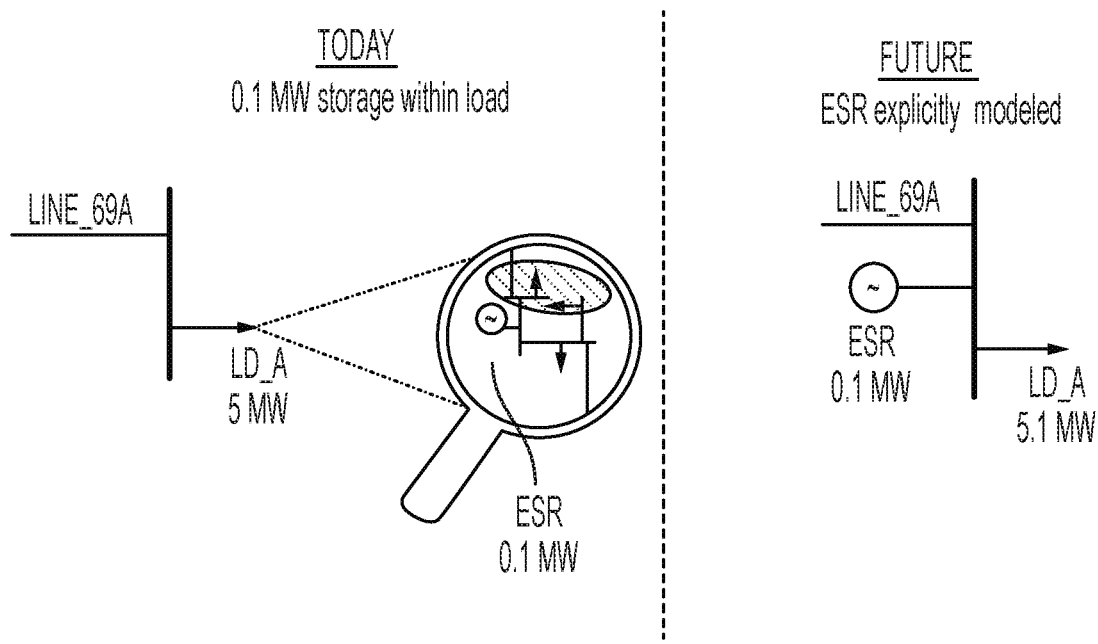
FIG. 4 illustrates an explicit modeling of a discharging ESR, in accordance with one or more embodiments.
Figure 5:
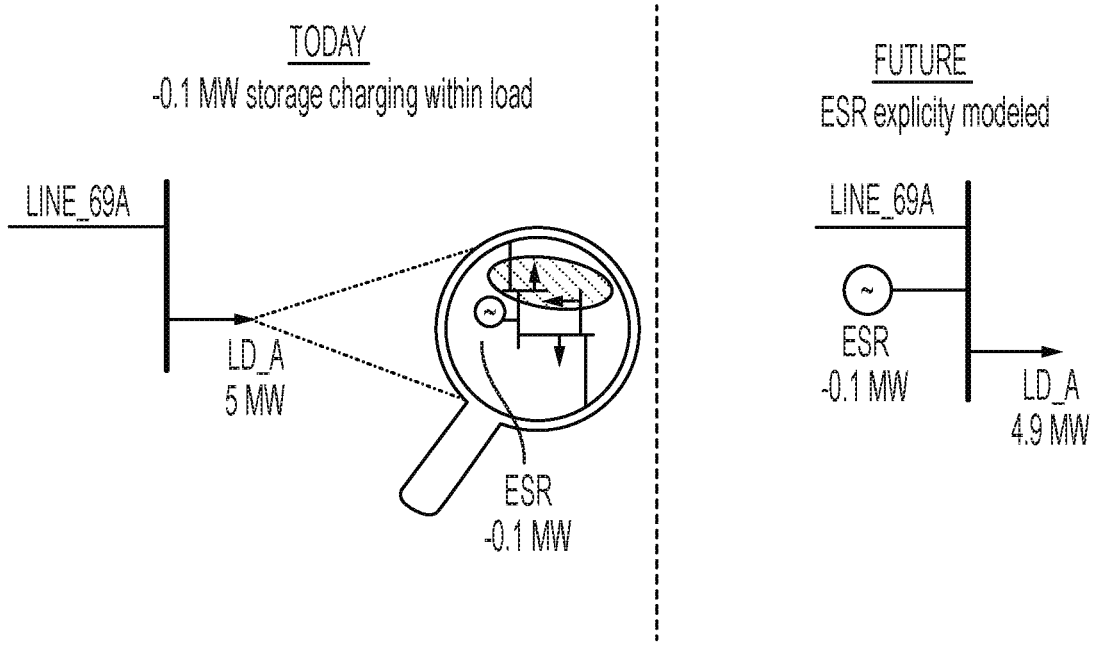
FIG. 5 illustrates an explicit modeling of a charging ESR, in accordance with one or more embodiments.

FIG. 4 illustrates an explicit modeling of a discharging ESR, in accordance with one or more embodiments. FIG. 5 illustrates an explicit modeling of a charging ESR, in accordance with one or more embodiments. In these figures, an ESR may currently reside within a "distribution equivalent" load. When the ESR is modeled as a resource, its impact may be required to be excluded from the modeled load. FIGS. 4-5 depict exemplary modeling of the ESRs that are explicitly connected to the distribution networks. In these FIGs., the left-hand-side shows the ESR embedded in load, and the right-hand-side shows explicit modeling. When the ESR is included in the load, its charging and discharge response is shown in the load measurement. If the load measurement at the left side of FIG. 4 shows 5.0 MW with ESR producing 0.1 MW, this signifies that the actual load is 5.1 and with ESR of 0.1, which gives effective load of 5.1−0.1=5.0 MW. Whereas if explicitly modeled, the load would measure at 5.1 MW and ESR 0.1 MW. Similarly, when charging as shown in FIG. 5 with effective load 5 MW and ESR consuming 0.1 MW, this signifies that the actual load is 4.9 and with 0.1 MW load consumption will give an effective load of 4.9+0.1=5.0 MW.

Some aspects of the aggregated (distribution connected) storage will now be described. Aggregation of ESRs to meet the 0.1 MW minimum requirement would only be allowed to the extent the aggregation may still be represented by a single point of injection in the current network model.

Aggregation across transmission busses or across load zones may not be supported under the ESR participation model. Aggregation of distributed energy resources (DERs) is also contemplated herein.

Some aspects of the ICCP modeling will now be described. The method of RT communication for ESRs may be inter control center protocol (ICCP). ICCP requirements for RTO/ISO generators may be driven by NERC reliability standards IRO-010 and TOP-003 and outlined in RTO-Spec-006. This includes the requirement of providing MW, MVar, and kV telemetry. Per business practice manual 031 (BPM 031), additional data points may be needed for a resource to participate in the DA and RT markets, such as control mode and breaker status.

The ICCP data requirements for an ESR may be added to BPM 031 and may include all data points associated with a market unit with additional data points communicating the SOC to the controller.

Some aspects of the ESR registration will now be described. ESR registration may follow current commercial modeling processes and deadlines. A new registration template may need to be provided, to include the following new required default parameters: maximum discharge limit (>=0.1 MW, i.e. Pmax); minimum discharge limit (>=0); minimum charge limit; maximum charge limit; charge and discharge ramp rates; default status; geolocation—latitude and longitude; storage type (medium/technology); maximum energy storage level; minimum energy storage level; efficiency factor; regulation minimum charge limit; regulation maximum charge limit; regulation minimum discharge limit; regulation maximum discharge limit; regulation (yes/no); spin (yes/no); supplemental (yes/no); quick start (yes/no); energy dispatch status; regulation dispatch status; online supplemental dispatch status; and/or offline supplemental dispatch status. In some embodiments, the bids and offers may be comprised of the physical limits of the resource for a given hour that can be used for dispatching the resource and the price points for various dispatch levels the resource is willing to offer (i.e., provide energy) or bid (i.e., purchase energy).

The current ESR participation model may allow ESRs to participate in the RTO/ISO markets in a way that recognizes their unique physical and operational characteristics. All resources meeting the FERC Order 841 definition of an ESR use participation model for ESRs may not be required to use the ESR participation model; these resources may continue to participate under existing participation models in which they are eligible to participate, or not to participate in any participation models if they only provide non-market products, as follows.

Some aspects of the distribution interconnection requirements will now be described. The interconnection requirements for a distribution interconnected resources (including ESR) may be posted online by at an ISO's website. The ISO may work through its stakeholder process to incorporate the requirements into the generation interconnection business practice manual.

Some aspects of the contemplated reliability (qualification) and non-market products will now be discussed. The controller's Tariff specifies two non-market products: reactive supply and voltage control and Blackstart. ESRs may be eligible to provide these services if they meet the technical qualifications.

Some aspects of the reactive supply and voltage control—Schedule 2—will now be described. No changes may be anticipated to the controller's processes to allow ESRs to participate under Schedule 2. In order to provide service under Schedule 2, an ESR may be required to be a reactive power resource. The ESR resource may be required to meet all technical qualifications as stated in Tariff and that are part of the controller's certification process as outlined in Schedule 2, paragraphs 1-4 in Section II.B.

A reactive power resource may be a qualified generator eligible to receive compensation for its voltage control capability once its cost-based revenue requirement has been accepted by FERC and its certification has been accepted by the transmission provider.

To apply for and receive Schedule 2 payment, an owner of an ESR may be required to be registered as a controller's MP, or use another MP as its agent. The controller may make edits to the Tariff language to clearly state that ESR's may recover costs under this section of the Tariff as long as they meet all technical requirements.

Some aspects of the Blackstart—Schedule 33—will now be described. No changes may be anticipated to the controller's processes to allow ESRs to participate under Schedule 33. The definition of Blackstart equipment may be modified to clearly include ESRs.

Blackstart service may enable transmission operators to designate specific generation facilities as Blackstart units whose location and capabilities are required to assist in re-energizing a specific portion of the transmission system following a system-wide blackout.

A Blackstart unit owner may be required to be a Tariff customer to qualify for payments under this Schedule 33. A qualifying Blackstart unit owner or a transmission operator may contract with an entity inside or outside of the transmission provider region for supply of Blackstart service if such Blackstart service is consistent with the transmission operator's system restoration plan, NERC reliability standards, and the minimum requirements of this Schedule 33. Payments may be made by the transmission provider to such a Blackstart unit owner or transmission operator as reimbursement for the FERC approved costs of the contract.

A Blackstart unit may be considered capable of providing Blackstart service when it meets the criteria established by NERC and the applicable regional entity, has been included in the transmission operators system restoration plan and/or entered into the database of the applicable regional entity's Blackstart capability plan. Notwithstanding the foregoing, a Blackstart unit may be required to meet the minimum requirements of Section III of this Schedule 33 to be eligible for compensation.

To apply for and receive Schedule 33 payment, an owner of an ESR may be required to be registered as a controller's MP, or use another MP as its agent. The controller may also make minor edits to the Tariff language to remove the word "generation" from the first paragraph of Schedule 33.

Some aspects of the contemplated resource adequacy will now be discussed. For example, some aspects of the participation options will now be described. For resources choosing not to participate under the ESR participation model, ESRs may qualify as a planning resource for resource adequacy as a load modifying resource (LMR). As an LMR, the resource may be registered as a behind the meter generator (BTMG) LMR type, which may be required to be capable of a continuous discharge of four hours after being issued a scheduling instruction during a controller's emergency event. Resources participating under the ESR participation model may qualify as a planning resource for resource adequacy as a capacity resource. Capacity resources may be required to be capable of a continuous discharge for every hour except when registered as a use limited resource. A use limited resource may be required to be capable of providing the energy equivalent of its claimed capacity for a minimum of at least four consecutive hours each day across the controller's peak. When participating as a capacity resource, the ESR may be subject to the qualifications described in the Tariff and the resource adequacy BPM for testing and deliverability requirements.

Some aspects of the qualification and accreditation will now be described. For example, some aspects of the minimum run will now be described. Capacity resources may be required to be capable of providing the energy equivalent of its claimed capacity for every hour of every day, except to the extent that the resource is unavailable due to a full or partial forced or scheduled outage. If a capacity resource is registered as a use limited resource, the resource may be required to provide its energy during the four continuous hours across the controller's peak.

Some aspects of the testing will now be described. All ESRs may be required to submit their generation verification test capacity (GVTC) test results conducted between September 1 and August 31 to the controller by October 31 prior to the start of the new planning year. The GVTC test results may include both the power rating (megawatt) and the net energy rating (megawatt-hours) of the ESR. The GVTC test may be required to be conducted at least one hour up to a maximum of four hours.

Some aspects of the outage data and forced outage rates will now be described. All outages and derates for ESRs including those registered as use limited resources need to be reflected in the controller's outage scheduler (CROW) or system data exchange (SDX). Generation availability data system (GADS) reporting may be required unless an ESR is less than 10 MW. If an ESR does not have more than 12 months of operational data or does not submit GADS data due to its capacity being less than 10 MW, the controller may apply the class average equivalent forced outage rate demand (EFORd) in the calculation of unforced capacity (UCAP). In the absence of the class average EFORd, the controller may apply the default XEFORd value of 5%.

Some aspects of the capacity determination will now be described. Installed capacity (ICAP) for ESR may be determined based on the power rating (MW) and net energy rating (MWh) of the ESR from the GVTC test and based on transmission deliverability (MW). The net energy rating value may be first converted to hourly equivalent discharge amount (HEDA) by dividing the energy rating value by the minimum run hours of 24. If an ESR is registered as a use limited resource, then the minimum run hours of four may be used. The ICAP value before applying its deliverability requirement may be calculated as a lower of ESR's power rating and the hourly equivalent discharge amount. Each ESR may be required to demonstrate deliverability in order to qualify as a capacity resource for participation in the planning resource auction (PRA). The ICAP value determined based on the GVTC test results above cannot exceed the ESR's transmission deliverability MW.

Unforced capacity may be calculated by applying the XEFORd value to the ICAP of an ESR. In the case the ESR does not have the XEFORd value; the controller may apply the ESR's default XEFORd value. Initially, the default XEFORd may be set to 5%. The default XEFORd value may be re-evaluated by the controller annually.

Some aspects of the deliverability will now be described. An ESR may be required to be able to demonstrate its transmission deliverability through either firm transmission service or interconnection service of NRIS or external NRIS. Depending on where the ESR's point of interconnection (POI) is located (transmission or distribution system), options for ESR to demonstrate deliverability vary. Table 2 shows different options.

TABLE 2

OPTIONS FOR AN MP WITH ESR TO DEMONSTRATE DELIVERABILITY

| Type of service | Action | POI on the Distribution System | POI on the Transmission System |
|---|---|---|---|
| Firm transmission service | Can apply for point to point or network transmission service using a type of "monthly" or "yearly" depending on the point of interconnection (POI) | Can utilize "yearly" type firm transmission service to facilitate a system impact study, if required | Can use "monthly" or "yearly" type of firm transmission service, since an ERIS study would have been completed; a network customer may designate an ESR as a network resource on an ISO's system utilizing firm transmission service |
| Interconnection service of NRIS or External NRIS (E-NRIS) | The MP of the ESR can enter the generation interconnection queue and apply for NRIS or E-NRIS | Can apply for E-NRIS | Is eligible for NRIS; the ESR may be part of an ISO's definitive planning phase (DPP) study and may be required to submit an application and deposits as appropriate; refer to BPM-015 generation interconnection for additional details |

Some aspects of the obligations will now be described. For example, some aspects of the day-ahead (DA) must offer will now be described. All capacity resources may be required to submit the full operable capacity of the resource, but not less than the ICAP value of zonal resource credits (ZRCs) committed in meeting the resource adequacy requirements, in the DA and the first post DA reliability assessment commitment (FRAC), except to the extent that the resource is unavailable due to a full or partial forced scheduled outage. An ESR may de-rate its capacity to provide capacity or other services if it is de-rating to meet minimum run-time requirements. The controller may request IMM verification, when the ESR's de-rated capacity does not represent physical withholding.

Capacity resources may be required to submit an offer into the DA market for every hour of every day, unless the resource registered as use limited. A use limited capacity resource may be required to submit an offer into the DA market for at least four continuous hours daily across the controller's forecasted daily peak (including weekends). The must offer period of four hours includes the two hourly intervals prior to the forecasted peak hour, the peak hourly interval, and one hourly interval after the forecasted peak load. This approach enables the controller to have an opportunity to schedule the resource for the period in which the use limited resource may not be recharging or replacing depleted resources. The controller's peak period may be based on the forecast published one day prior to the operating day in the market report provided on an ISO's website (e.g., on Midcontinent ISO (MISO) Inc.'s website).

An ESR may de-rate its capacity to provide capacity or other services if it is de-rating to meet minimum run-time requirements. The de-rated quantity may be based on the quantity of energy that an ESR may discharge continuously over the set minimum run-time. An ESR that elects to de-rate its capacity may be required to not de-rate below its capacity obligation. The controller may request IMM verification that the ESR's de-rated capacity does not represent physical withholding.

Some aspects of the planning resource auction offer will now be described. All accredited UCAP of ESRs may be required to be converted to ZRC before they may be used in the frap or offered into the PRA. All ESRs accredited may be subject to the physical withholding provisions in the PRA.

Some aspects of the contemplated market participation eligibility, as both buyer and seller, will now be discussed. ESRs may buy and sell energy in RTO/ISO markets and may set price both as buyer and seller at the locational pricing node where ESR is modeled in the controller network and commercial models. ESRs may set the extended locational marginal price (ELMP), but they may not be qualified as fast start resources. ESRs may be eligible to offer the below dispatch products.

The not qualified status may be only be available if the higher order reserve product is also not qualified. The not participating stat us may be only be available for offline supplemental reserves if the resource is not a capacity resource identified via Module E. And only one of the spinning reserve and on-line supplemental reserve dispatch products may be cleared.

Some aspects of the contemplated offer parameters, commitment, and dispatch will now be discussed. For example, some aspects of the ESR offer parameters will now be described. The current ESR participation model may include the following ESR offer parameters. ESRs may submit appropriate offer parameters in both the DA and RT markets. Not all offer parameters may be required in an MP's offer. This may be consistent with how parameters are submitted for other MPs.

Some aspects of the ESR self-scheduled energy constraints will now be described. While self-scheduled ancillary services will be treated the same as existing resource types, ESR's potential for self-scheduling energy charging (negative) and discharging (positive) levels has led to a need for special interpretation of self-scheduled energy for ESRs.

For ancillary service products, the rule applied to existing resource types may also be applied to ESRs indicating a minimum amount of the specified product, which may clear this relationship: self-scheduled product quantity less-than or equal-to ($<=$) dispatched product quantity.

For current resources, this same constraint may be applied to self-scheduled energy. For each self-scheduled product, this constraint creates a minimum level of clearing and additional quantities may be scheduled above the self-scheduled energy level when it is economic and feasible within all applicable constraints.

Although self-scheduled energy may be approached the same way for ESRs, the self-scheduled energy logic may be expanded to accommodate charge and discharge capabilities. Consistent with the current self-scheduling logic, additional charging may be allowed when charge is self-scheduled and additional discharging may be allowed when discharging is self-scheduled. With charging specified with a negative value, the ESR logic may be summarized, as follows: if self-schedule energy is greater than ($>$) 0, then self-scheduled energy is $<=$dispatched energy; else, if self-schedule energy is less than ($<$) 0, then self-schedule energy is greater-than or equal-to ($>=$) dispatched energy; and else (i.e., self-schedule energy=0 or self-schedule energy is null) no self-schedule energy constraint is applied.

Some aspects of the RT offer overrides will now be described. The controller may allow MPs to enter overrides on RT offer parameters for ESRs. These overrides may be effective for the current hour and the next operating hour.

TABLE 3

| | DISPATCH PRODUCTS | | | | |
|---|---|---|---|---|---|
| DISPATCH STATUS | Energy | Regulating reserve | Spinning Reserve | On-line Supplemental Reserve | Off-line Supplemental Reserve |
| Economic | ✓ | ✓ | ✓ | ✓ | ✓ |
| Self-schedule | ✓ | ✓ | ✓ | ✓ | ✓ |
| Not Participating | ✓ | ✓ | X | X | ✓ |
| Not Qualified | X | ✓ | ✓ | ✓ | ✓ |
| Emergency | X | X | X | X | ✓ |

TABLE 4

| OVERRIDES | ELECTRIC STORAGE RESOURCE |
|---|---|
| Commitment Status | Charge, Discharge, Continuous, Available, Outage, Emergency Charge, Emergency Discharge |
| Unit Limits | Minimum and Maximum Discharge Limit, Minimum and Maximum Charge Limit Minimum and Maximum Regulation Limit, Minimum and Maximum Regulation Limit Minimum and Maximum Emergency Discharge Limit, Minimum and Maximum Emergency Charge Limit |
| Energy Storage Level Limits | Minimum Energy Storage Level, Maximum Energy Storage Level, Emergency Minimum Energy Storage Level, Emergency Maximum Energy Storage Level |
| Self-schedules | Self-scheduled Energy, Self-scheduled Regulation, Self-scheduled Spinning Reserve Self-Scheduled On-line Supplemental Reserve, Self-scheduled Offline Supplemental Reserve |
| Dispatch Status | Energy Dispatch Status, Regulation Reserve Dispatch Status, Spinning Reserve Dispatch Status On-line Supplemental Reserve Dispatch Status, Off-line Supplemental Dispatch Status Ramp Capability Dispatch Status |
| Off Control, EEE Flag | Off Control, EEE Flag |

Some aspects of the ESR SOC constraints will now be described. Although ESRs may be initially implemented on the principle that MPs manage an ESR's SOC, the controller may apply SOC-based constraints to ensure resource capability is available when needed and to constrain economic dispatch of ESRs. In some embodiments, the dispatch value is arrived at by taking into account what the commitment status is and where the current resource energy level (SOC) is. The resource physical levels (e.g., limits) may never be breached so the amount of dispatch may be constrained by the storage level of the resource. The applied constraints include SOC minimum and maximum limits and SOC levels sufficient to support cleared energy and reserve products.

Some aspects of the SOC limits will now be described. The ESR's SOC may be required to stay between the applicable (i.e., normal or emergency) minimum and maximum operating limits to maintain physical feasibility. The SOC may be required to be calculated within the market clearing process to ensure the impact of market cleared quantities on the SOC stays within limits.

In concept, all market products may impact an ESR's SOC. Cleared discharge energy may always have a 100% impact on SOC. Thus, a tuning factor may not be included, in the following formula. A conversion factor, the ESR efficiency factor, may be applied to charging energy to capture the SOC impact of losses in the storage process. With the efficiency factor applied in this way, the SOC represents the energy that may be output from the ESR after any storage-to-electricity losses.

Other products may have an SOC impact that may not be 100%. For example, if equal regulation up and down is expected, the SOC impact of regulation may be 0%. Similarly, if contingency reserve is unlikely to be deployed in the cleared interval, the controller may assume the impact of contingency reserve is also 0%. The "use factors" relating various products to the SOC impact may be determined and adjusted by the controller based on operational experience. Additional granularity of use factors, such as time of day variations, may be introduced if determined to be beneficial.

Formula 1, as follows, relates the SOC at the end of the current interval t to the SOC at the end of the prior interval and cleared products.

$$SOC_t = \text{if } t=1 \text{ then } SOC_{initial} \text{ else } SOC_{t-1} - (\text{interval } t \text{ minute duration}/60 \text{ minutes})*[clearedMW_t*\{\text{if } clearedMW_t >= 0 \text{ then } 1 \text{ else ESR efficiency factor}\} + regMW_t*\text{reg storage use factor} + spinMW_t*\text{spin storage use factor} + suppMW_t*\text{supp storage use factor}] \quad (1)$$

Where the ESR efficiency factor is the ratio of discharge energy to charge energy for an ESR.

With the SOC calculated, the market clearing function may constrain the ESR's resulting end of interval SOC to be within the applicable SOC minimum and maximum limits specified for that interval, as exemplarily formulated: $SOCmin_t <= SOC_t$; and $SOCmax_t >= SOC_t$.

Some aspects of the SOC requirements for ancillary services will now be described. Although ancillary service storage use factors may reflect that the expected impact on the SOC for future intervals may be muted, reliability needs may require that sufficient SOC is available in an interval to support the cleared reserve should it be deployed within the interval.

Additional storage reliability factors may be introduced to relate cleared ancillary services with SOC available within the current interval. For example, even if the reg storage use factor is set to 0 reflecting balanced regulation up and down deployments, if reliability concerns dictate that the SOC must support the full deployment of regulation up for the whole interval, the regulation-up storage reliability factor may be set to 100%, or if deployment for the first half of the interval should be supported, regulation-up storage reliability factor may be set to 50%. As with use factors, additional granularity of reliability factors, such as time of day variations, may be introduced if determined to be beneficial.

The reliability-based SOC support for upward ancillary services is exemplarily constrained in Formula 2, as follows, in which an interval's cleared energy MW is positive for discharged energy or negative for charging energy.

$$SOCmin_t <= SOC_{t-1} - (\text{interval } t \text{ minute duration}/60 \text{ minutes})*[clearedMW_t*\text{if } clearedMW_t >= 0 \text{ then } 1 \text{ else ESR efficiency factor} + regMW_t*\text{regulation-up storage reliability factor} + spinMW_t*\text{spin storage reliability factor} + suppMW_t*\text{supp storage reliability factor}] \quad (2)$$

The reliability-based SOC support for downward ancillary services is exemplarily constrained in Formula 3, as follows.

$$SOCmax_t >= SOC_{t-1} \text{ (interval } t \text{ minute duration}/60 \text{ minutes})*[clearedMW_t*\text{if } clearedMW_t >= 0 \text{ then } 1 \text{ else ESR efficiency factor} + regMW_t*\text{regulation-down storage reliability factor}] \quad (3)$$

The constraints associated with storage reliability factors may be applied within the current interval and may not directly impact the anticipated SOC in future intervals such that if ancillary service energy is required beyond the use factor assumptions, future intervals may need to be rescheduled to maintain feasibility with the new SOC resulting from the unanticipated energy use by the ancillary services.

Some aspects of the ESRs in commitment and dispatch will now be described. Electric storage resources (ESRs) consume and store energy at one time and inject the stored energy in a different interval. An ESR may provide energy and the ancillary services it is capable of providing in the controller's energy and operating reserves (ORs) markets. The controller's market clearing dispatch in both day-ahead (DA) and real-time (RT) markets sequentially optimized single intervals. The ESR SOC constraints may be modeled in the dispatch functions to ensure the market dispatch keeps the SOC within limits while enabling the market participant (MP) to manage ESR's SOC.

The controller's DA and RT markets perform two types of analysis: SCUC and security-constrained economic dispatch (SCED) analyses.

SCUC may optimize simultaneously over multiple market intervals to determine the best use of market offers including determination of resource commitments, regulation selection, and the plan for the use of maximum daily energy limits. In some embodiments, an ISO operating as an RC must ensure that the system is reliable under normal and stressed conditions. To have the system ready at all times for adverse conditions, the system may be secured for any system element loss (e.g., if there are 13000 what if scenarios that can happen, happens). SCUC may make sure to position the system in that secure fashion so that, if a loss of system element occurs, the power may still be delivered reliably. The offered ESR commitment status may indicate the resource's operating mode in each hour such that SCUC may not make commitment decisions for the ESR. With the ESR SOC managed by the MP and potential performance challenges optimizing the SOC in SCUC, ESR SOC constraints may not be modeled in SCUC. Taking a conservative approach summarized for anticipated typical ESR offers in the table below, SCUC may assume ESRs contribute the smallest (energy at corresponding economic minimum, regulation at 0) available clearing of each product, considering the applicable offer limits and self-scheduled products but not considering the SOC limits. When emergency commitment status resources are used in SCUC, ESRs may be made dispatchable from zero MW for the commitment analysis. ESRs that are used to alleviate emergency and are offered in commitment status of (i) charge; (ii) discharge; (iii) continuous; may be dispatched to the corresponding emergency limit in the SCUC process. This may let SCED know the intervals in which the ESR is used with emergency limits. ESRs with commitment status of emergency discharge status may be included for maximum generation conditions, and emergency charge status ESRs may be included for minimum generation conditions. Hours in which emergency MWs are non-zeros may be treated as commitment hours by SCED where the applicable minimum and maximum limits may be applied. For the initial ESR implementation, ESR commitment parameters such as minimum run time or minimum charge time may not be enforced if the commitment status offered in the intervals when honoring each of these parameters would conflict. Additionally, if the SOC of the ESR is not sufficient to honor these parameters then these may be ignored and may not be satisfied by the resulting schedule. Future ESR enhancements may improve SCUC ESR modeling.

TABLE 5

| | COMMITMENT MODES | | | | |
|---|---|---|---|---|---|
| Cleared Product | Discharge | Charge | Continuous | Emergency Discharge | Emergency Charge |
| Energy (MW) | min discharge limit | min charge limit | 0 | >0 | <0 |
| Reserves (MW) | 0 | 0 | 0 | 0 | 0 |

SCED may determine the financially binding market clearing solution optimizes for one single interval market at a time. In each separately optimized single interval, SCED may economically dispatch ESR charging or discharging and allow the ESR to set price similar to other types of resources while considering the SOC at the beginning and end of the interval. The ESR SOC constraints may be applied in SCED to ensure the physical limits of the SOC are respected in the final dispatch. In each interval, the available SOC flexibility may be considered with respect to the current interval economics and needs. SCED may not use the ESR in the current interval to prepare for potential opportunities in a future interval. This management of the SOC between market intervals may be left to the MP.

To reserve SOC capability sufficient to support future interval self-schedule or minimum charge/discharge levels are feasible with respect to the SOC limits, the MP may adjust the minimum and/or maximum SOC limits more conservatively than the physical operating limits. If previous interval dispatch has resulted in conflict between SOC constraints and other resource constraints, the current interval SCED may be required to relax the conflicting limits which may present the operator with physical infeasibilities to resolve.

Some aspects of the conflicting ESR input data will now be described. The market clearing function may apply validation logic to identify and harmonize conflicting input data to ensure a feasible solution. For example, if the self-scheduled products exceed the resource maximum capacity, the data may not be consistent and may be altered such that the market clearing results are not obstructed or distorted by the inconsistent input data. To the extent possible, existing validation logic may be applied to ESRs.

In addition, ESRs may introduce new parameters and potential conflicts, which may require extension of offer parameter validation to consider ESR parameters. For example, if application of a self-scheduled MW for minimum charge or discharge operating limit violates an SOC limit in an interval's SCED dispatch, the self-scheduled MW or minimum operating limit may be relaxed to the level consistent with the applicable SOC limits.

Some aspects of the contemplated SOC measurement and management will now be discussed. The current disclosure may not propose an alternative to manage the SOC for ESRs. Current capabilities for stored energy resources (SERs) that consider SOC in deploying ORs may not apply to stored energy resource—type II, nor will they apply to ESRs. MPs may be responsible for managing the SOC through available offer parameters or other means, as described throughout this document.

Some aspects of the state of charge (SOC) management will now be described. The controller may not manage SOC for ESR resource. MPs may be responsible for the ESR's SOC and its impact on other parameters such as the efficiency factor through available offer parameters and/or telemetry. Because the ESR SOC is managed by the MP, the ESR may be subject to the same penalties as other resource for deviating from its dispatch instructions.

The upcoming AGC enhancement, to be implemented in 2019, establishes a preferred range for deployment of regulating reserve, primarily for stored energy resources, but may be available as an offer parameter for all regulation qualified resources, including ESRs.

Some aspects of the SOC measurement will now be described. In RT, an ESR may provide the controller its SOC via telemetry through ICCP every four seconds. It may also offer normal and emergency energy storage level (SOC) minimum and maximum limits to constrain the SOC via its ESR offer. An SOC may be a state of charge that indicates a current stored energy level in an energy storage system.

Some aspects of the initial SOC level will now be described. In the RT UDS clearing, the controller may receive the current state of charge (SOC) at beginning of the market interval (e.g., a 5 minute period) via ICCP. The applicable energy storage level minimum and maximum limits, including the impact of RT overrides and emergency conditions, may be applied to help determine the ESR interval dispatch.

For the DA market, the MP offered SOC parameter may indicate the initial SOC forecast at the beginning of the market day. The offered SOC may be the initial SOC value used as the basis for constraining the SOC within the applicable SOC minimum and maximum limits, including the impact of RT overrides and emergency conditions, sequentially through all hours of the operating day.

The forward RAC study use the offered SOC similar to the DA market.

For intra-day RAC and LAC the beginning interval SOC may be sourced from RT telemetered data. Beginning interval SOC of the ESR may then be calculated using the DA awarded volume. For example if ESR RT telemetry of SOC at 11:10 is 30 (MWh) and RAC interval beginning is from 12:00 and DA award for this hour is 10 mw discharge then the beginning interval SOC for IRAC may be calculated as 30−(60−10)*(10/60).

Some aspects of the contemplated settlements (e.g., make whole payments, compensation, performance, penalties, etc.) will now be discussed. For example, some aspects of the compensation will now be described. ESRs may be credited for the DA injection volumes and charged for the DA withdrawal volumes at the DA LMP of the ESR commercial pricing node. ESRs may be credited for the DA clearing of any ancillary service products and/or ramp capability product at the corresponding DA MCP of the ESR commercial pricing node.

ESRs may be credited and charged for the net non-excessive energy volumes at the RT LMP of the ESR commercial pricing node. Excessive energy volumes may be paid at the lesser of RT LMP or offer cost. ESRs may be credited and charged for the net clearing of any ancillary service products and/or ramp capability product at the corresponding RT MCP of the ESR commercial pricing node.

Some aspects of the make-whole payments will now be described. The controller may provide ESRs the same make whole payment options as provided for generation resources. This includes make whole payments applicable for manual dispatch instructions given by the controller. There may be exceptions to eligibility requirements and calculations, but the principles for such make whole payments may apply to ESRs as they do for generation resources.

Some aspects of the DA and RT revenue sufficiency guarantee make-whole payments will now be described. ESRs committed for emergency in the DA or committed for emergency or contingency reserve deployment in the RT may be evaluated for a make-whole payment to ensure market revenues at least recover the resources production costs. If the ESR commitment meets the eligibility requirements and market revenue falls short of the total productions cost, then a make-whole payment may be provided.

Some aspects of the DA ELMP make-whole payment will now be described. ESRs with a must run commitment may be evaluated for a DA ELMP make-whole payment to ensure the resulting ELMP covers the energy offer cost of clearing MWs in the DA market.

Some aspects of the day-ahead margin assurance payments (DAMAP) will now be described. ESRs with a DA commitment may be evaluated for DAMAP to ensure DA margins may not be eroded when the resource is dispatched below the DA cleared volumes in RT. If the ESR meets the eligibility requirements, then DAMAP may be provided in instances in which the DA margin has been eroded.

Some aspects of the RT offer revenue sufficiency guarantee payments (RTORSGP) will now be described. ESRs committed in the DA market or must-run in the RT market may be evaluated for RTORSGP under the following conditions: dispatched for energy sales above economic minimum (discharge minimum) or injections above DA scheduled level; and dispatched energy purchases above charge minimum or withdrawals above DA schedule level. If the ESR meets the eligibility requirements, then RTORSGP may be provided given the costs to provide more energy and/or ORs exceeds the market revenues from these products.

Some aspects of the performance will now be described. ESRs may be expected to follow dispatch when both charging and discharging using the same methodology as generation resources. In each dispatch interval in which an ESR is charging or discharging, excessive and deficient energy thresholds may be calculated to evaluate performance. If an ESR has four or more consecutive intervals of excessive and/or deficient energy, then it may be considered to have failed to follow dispatch and assessed the applicable charges. The only difference in determining these thresholds from other resources is that there may be no minimum threshold level provided. Other resources may be given at least 6 MW of tolerance. Given the minimum capacity requirement for an ESR of 100 kW, this minimum threshold level of 6 MW would not provide the proper incentive for ESRs to follow dispatch.

ESRs may be capable of providing contingency reserves during an automatic reserve sharing (ARS) event. The existing contingency reserve deployment compliance monitoring and the associated consequences may be applied to ESRs such as the four compliance tests, contingency reserve deployment failure charges, and restrictions on future contingency reserve clearing.

ESRs may also be capable of providing regulation. In some embodiments, an ISO may use an automatic generation control (AGC) system to calculate (e.g., at 4 second intervals) each resource setpoint. Setpoints may be made up of base points (e.g., an energy value calculated for a 5 minute interval) and deployed reserves (e.g., including regulating reserves). The reserves deployments values may be calculated (e.g., every 4 seconds) to balance the system. An ESR that can respond to a setpoint instruction changing frequently may provide such a service to the system and get compensated for that service. An ESR may be evaluated for regulation performance using the same methodology as other resources. The same charges for other resources may apply if an ESR fails the regulation mileage performance testing in 4 or more consecutive dispatch intervals within a given hour.

Some aspects of the uplift charges will now be described. ESRs may be exempted from uplift charges based on the concept that all the MWs bought to charge may then be sold back to the market when discharging. This includes the following uplift charges: revenue neutrality uplift; demand response resource uplift; ancillary service distributions; and/or any load ratio share adjustments.

However, ESRs may be assessed RT RSG distribution charges for the following conditions: having excessive/deficient energy MWs when failing to follow dispatch in a given hour; having harming deviations (including limitations due to insufficient SOC) as a result of changing charge/discharge limits from the DA; and/or having harming deviations (including limitations due to insufficient SOC) as a result of changing charge/discharge limits prior to the notification deadline in RT. The RT RSG distribution charges would be exempted for an ESR in all hours in which the resource is manually re-dispatched by the controller.

Some aspects of the contemplated metering and accounting will now be discussed. For example, some aspects of the energy accounting and settlement will now be described. ESRs may be modeled as generation resources and report their meter data consistent with an ISO's current business practices defined for generation resources. ESR energy transactions may be considered wholesale storage energy withdrawals and injections for accounting and settlement purposes.

Withdrawals for charging energy, including conversion efficiency losses, may not be considered load or actual energy withdrawals under Module C of the Tariff. Actual energy withdrawals at load zones by LSEs may be purchases as sales for resale. ESRs may be modeled and metered such that all energy entering and exiting the resources is measured for reliability and settlement purposes.

For settlement accounting purposes, injections and withdrawals associated with ESRs may be considered actual energy injections per the definition in Module A that currently applies to stored energy resources and stored energy resources type II. Withdrawn volumes (positive) will be treated as negative generation and may not be subject to load based charges or distributions.

Some aspects of the metering requirements will now be described. Electric storage assets may be directly metered, and reported actual energy injections may include conversion efficiency losses. ESR owners may be required to have revenue quality metering as specified in Tariff Section 38.2.5.e. For ESRs connected to the transmission system, MPs may be required to report all wholesale storage energy injections and withdraws. For ESRs connected to distribution system, the MP may be required to have sufficient metering or accounting for non-wholesale transactions such that only wholesale storage energy injections and withdraws are reported. The controller may implement periodic checks or audits of ESR meter submittals to ensure compliance with the Tariff and business practices.

Some aspects of the energy settlement and residual load will now be described. Actual energy injections at ESRs, both injections and withdrawals, may be settled at the appropriate LMP for the commercial pricing node of the ESR. DA purchases or sales associated with the ESR's cleared energy schedules may be settled at the appropriate LMP for the commercial pricing node of the ESR. RT energy imbalances, sales, and purchases, including conversion efficiency losses, may be settled at the appropriate LMP for the commercial pricing node of the ESR. ESRs may be assumed to be metered as part of the local balancing authority where they are modeled for purposes of residual load calculations.

Some aspects of the wholesale charging settlement exemption will now be described. An ESR cannot be a conduit to serve load (sale for resale), avoid transmission charges, or achieve access to transmission and energy markets from behind the meter, unless otherwise authorized by transmission provider and/or relevant electric retail regulatory authority. Station power, which excludes charging energy and conversion efficiently losses, may be required to be metered and reported separately from the ESR's actual energy injections.

ESRs using the participation model who certify in writing that they are being assessed retail rates for charging energy may be credited for metered volumes associated with the actual energy injections of such withdrawals, subject to verification and authorization by applicable load serving entities, local balancing authority (LBA), and relevant electric retail regulatory authority (RERRA). Metered withdrawal volumes associated with wholesale charging settlement exemptions may be considered residual load and added to the LBA residual load account.

Some aspects of the on-site energy and station power will now be described. On-site charging from behind the meter generation, or increases in pond level at pump hydro storage from non-grid powered supply (rain, runoff, etc.) may be required to be excluded from the MP's submitted ESR metered withdrawal values. On-site charging of ESR may not be a wholesale storage energy withdrawal transaction. On-site discharge from ESR to serve station power or other load may be required to be excluded from ESR metered injection volumes. On-site discharge from ESR may not be a wholesale storage energy injection transaction.

Some aspects of the contemplated market monitoring and mitigation will now be discussed. FERC's final rule establishes new offer parameters requiring monitoring and mitigation. Additionally, the final rule mandates treatment of certain behaviors with respect to physical and economic withholding sanctions and mitigation. Paragraph 163 states: "it is the responsibility of each RTO/ISO, not of its market monitor, to prevent conflicting dispatch." Paragraph 256 states: "an ESR de-rating its capacity to provide capacity or other services may not be engaging in physical withholding if it is de-rating to meet minimum run-time requirements (i.e., for true and verifiable reasons). Each RTO/ISO may request the market monitor to verify whether an ESR de-rated its capacity to meet a minimum run-time requirement to ensure that those resources are not engaging in physical withholding." "If an ESR has an obligation to participate in an RTO/ISO market, the ESR's misrepresentation of its limitations could constitute manipulation, and physical or economic withholding." "Each RTO/ISO should demonstrate how its existing market rules provide a means for energy-limited resources, including ESRs, to provide capacity. This may include ways to represent energy limitations through offer prices which, if allowed by the RTO/ISO, would not constitute economic withholding." And paragraph 257 states: "an ESR should not manage its state of charge in a manner inconsistent with its physical and operational characteristics. The market monitor has the ability to review offers from ESRs to detect economic and physical withholding."

Some aspects of the ESR offer parameter monitoring and mitigation will now be described. The controller and the IMM may rely on general Tariff provisions similar to 40.2.5.e and 39.2.5.c regarding values in offers to monitor and address potential exercise of market power or market manipulation for ESRs.

Some aspects of the ESRs with capacity resource must offer obligations will now be described. For an ESR that becomes a capacity resource and meets all the requirements as specified in the BPM for resource adequacy, including the requirement to be able to continuously discharge for a minimum set of four consecutive operating hours across the transmission provider's coincident peak for each day, in accordance with the BPM for resource adequacy, provided, that, a stored energy resource—type II may de-rate its capacity in order to comply with this requirement. The contents of Section 69a.3.1 in Module D—Capacity Resources are incorporated herein by reference in their entirety.

Some aspects of the compliance approach will now be described. Some embodiments may file tariff changes similar to stored energy resource type II related to capacity resources and physical and economic withholding. Some embodiments may monitor ESRs including offer parameters and exercise of market power. Some embodiments may request Tariff changes in the future as necessary, including price sensitive RT consumption for example.

Some aspects of generation offers, DRR-II offers, and ESR offers will now be described.

MPs may submit self-schedules for energy and/or operating reserve from their resources, other than ESRs, in whole or in part, in the DA energy and operating reserve market. MPs that submit self-schedules for energy may be required to submit a MWh quantity and the applicable hour for each self-scheduled resource. MPs that submit self-schedules for OR may be required to submit a MW quantity and the applicable hour for each self-scheduled resource. MPs that submit self-schedules for energy and/or OR may be price takers for each self-schedule. Self-schedules for energy may be required to be greater than or equal to the hourly economic minimum limit and less than or equal to the hourly economic maximum limit. Self-schedules for regulating reserve may be required to be greater than or equal to 1 MW for each self-scheduled resource and may only be submitted for regulation qualified resources. Self-schedules for spinning reserve may be required to be greater than or equal to 1 MW for each self-scheduled resource and may only be submitted for spin qualified resources. Self-schedules for supplemental reserve may be required to be greater than or equal to 1 MW for each self-scheduled resource and may only be submitted for supplemental qualified resources that are not also spin qualified resources or for supplemental qualified resources that are quick start resources that are uncommitted. The acceptance of self-schedules for a specific self-scheduled resource may be contingent on: (i) the commitment of the self-scheduled resource; and (ii) compliance with the corresponding self-scheduled resource limit and ramping constraints as set forth in Schedule 29. If a self-schedule is accepted by the transmission provider, the resource schedules for energy and OR may clear above the self-scheduled amounts based on the submitted offers, as needed, in an economic manner based upon the simultaneously co-optimized solution. The transmission provider may reduce self-schedules as necessary to manage transmission constraints, maintain OR requirements, satisfy energy demand and/or maintain reliable operating conditions. In no case will the transmission provider violate the resource limits.

MPs may submit self-schedules for energy and/or OR from their ESRs, in whole or in part, in the DA energy and OR market. MPs that submit self-schedules for energy may be required to submit a MW quantity and the applicable hour for each self-scheduled resource. MPs that submit self-schedules for OR may be required to submit a MW quantity and the applicable hour for each self-scheduled resource. MPs that submit self-schedules for energy and/or OR may be price takers for each self-schedule. Self-schedules for energy may be required to be: (i) greater than or equal to the hourly discharge minimum limit and less than or equal to hourly discharge maximum limit with a discharge commit status; (ii) greater than or equal to the hourly charge maximum limit and less than or equal to hourly charge minimum limit with a charge commit status; (iii) greater than or equal to hourly charge maximum limit and less than or equal to hourly discharge maximum limit with a continuous commit status. Self-schedules for regulating reserve may only be submitted for regulation qualified resources. Self-schedules for spinning reserve may only be submitted for spin qualified resources. Self-schedules for supplemental reserve may only be submitted for supplemental qualified resources that are not also spin qualified resources or for supplemental qualified resources that are quick start resources that are in available commitment status. The acceptance of self-schedules for a specific self-scheduled ESR may be contingent on: (i) the commitment of the self-scheduled ESR; and (ii) compliance with the corresponding self-scheduled ESR limit and ramping constraints as set forth in Schedule 29. If a self-schedule is accepted by the transmission provider, the ESR schedules for energy and OR may clear above the self-scheduled amounts based on the submitted ESR offers, as needed, in an economic manner based upon the simultaneously co-optimized solution and with the following rules: (i) if the self-schedule energy amount is greater than zero then energy MW amount above this value could be economically dispatched; (ii) if the self-schedule energy amount is less than zero then energy MW amount below this value could be economically dispatched; (iii) if the self-schedule amount is equal to zero then self-schedule offer may be ignored. The transmission provider may reduce self-schedules as necessary to manage transmission constraints, maintain OR requirements, satisfy energy demand and/or maintain reliable operating conditions. In no case will the transmission provider violate the ESR limits based on the offer commitment status.

Resources may not self-schedule up ramp capability or down ramp capability in the DA energy and OR market.

Some aspects of the ESR offer rules in the DA energy and OR market will now be described. MPs that intend to supply energy, OR, up ramp capability, and/or down ramp capability in the DA energy and OR market from ESRs may provide the information specified herein. ESR offers may be submitted in the DA energy and OR market only for registered ESRs. ESR offers may remain in effect for the DA energy and OR market until specifically superseded by subsequent ESR offers. Each MP may only submit a single ESR offer for each individual resource.

Some aspects of the eligibility to discharge and/or charge will now be described. ESRs may discharge (sell) or charge (purchase) energy in the DA energy and OR market if the transmission provider has certified the resource is capable of responding to five minute dispatch targets for energy and has the appropriate telemetry installed as set forth in the business practices manuals. An ESR may not (i) offer to charge and/or discharge energy, (ii) offer and/or supply OR, or (iii) offer and/or supply up ramp capability or down ramp capability unless such resource has been included in the network model. An ESR may supply regulating reserve, spinning reserve, supplemental reserve, up ramp capability, and/or down ramp capability in the DA energy and OR market if the transmission provider has certified that the resource is a regulation qualified resource, spin qualified resource, supplemental qualified resource, and/or up and down ramp capability qualified resource, respectively. MPs that offer to transact energy, regulating reserve, spinning reserve, supplemental reserve, up ramp capability, and/or down ramp capability in the DA energy and OR market may provide the offer information specified below.

Some aspects of the required ESR offer components will now be described. MPs that submit ESR offers may include a discharge and/or charge energy offer curve, a regulating capacity offer and a regulating mileage offer (if a regulation qualified resource), a spinning reserve offer (if a spin qualified resource), an on-line supplemental reserve offer (if a supplemental qualified resource but not a spin qualified resource), an off-line supplemental reserve offer (if a quick-start resource), a start-up offer, a no-load offer, and an up and down ramp capability dispatch status offer. MPs may provide ESR offers for the full energy storage capabilities of their resource pursuant to the requirements outlined in Section 39.2.1b. MPs may submit ESR offers to the DA energy and OR market up to seven days prior to the operating day, and may modify these ESR offers up until the time the DA energy and OR market closes, as specified in Section 39.1.1. Any limits on the ESR offer covering the full energy storage capability of the resource may be required to be consistent with Module D. A single ESR offer may be submitted in the DA energy and OR market for each hour of the operating day for which the MP is willing to sell OR and/or purchase energy to charge and/or discharge to sell energy from a given resource. The transmission provider may maintain a DA energy and OR market ESR offer for each resource. These offers may be standing offers and may be maintained for the DA energy and OR market independent of the RT energy and OR market. These offers may be updated prior to the close of the DA energy and OR market. ESR offer components may be as follows.

Some aspects of the energy offer curve will now be described. The energy offer curve to either charge and/or discharge may be expressed for each hour in $/MWh and may consist of either a stepped or a piecewise linear offer curve of up to ten segments, may be monotonically increasing, and may cover the full operating including emergency range as applicable to the commitment status of the ESR.

Some aspects of the regulating capacity offer and regulating mileage offer will now be described. The regulating capacity offer may consist of either a stepped or a piecewise linear offer curve of up to three segments, may be monotonically increasing, and may only be applicable to regulation qualified resources expressed for each hour in $/MW/hour. The regulating mileage offer may be a single value expressed for each hour in $/MW and may only be applicable to regulation qualified resources. If the regulating capacity offer is negative, then the regulating mileage offer may be required to be $0/MW.

Some aspects of the spinning reserve offer will now be described. The spinning reserve offer may be expressed for each hour in $/MW/hour and may consist of either a stepped or a piecewise linear offer curve of up to three segments and may be monotonically increasing and is only applicable to spin qualified resources.

Some aspects of the on-line supplemental reserve offer will now be described. The on-line supplemental reserve offer may be expressed for each hour in $/MW/hour and may consist of either a stepped or a piecewise linear offer curve of up to three segments, may be monotonically increasing, and may only be applicable to supplemental qualified resources that are not spin qualified resources.

Some aspects of the off-line supplemental reserve offer will now be described. The off-line supplemental reserve offer may be expressed for each hour in $/MW and may consist of either a stepped or a piecewise linear offer curve of up to three segments, may be monotonically increasing to discharge and may only be applicable to resources that are quick-start resources and have commitment status as available.

Some aspects of the start-up offer will now be described. The start-up offer may be expressed for each day in $/start. A separate start-up offer may be submitted for hot, intermediate, and cold start-up conditions.

Some aspects of the no-load offer will now be described. The no-load offer may be expressed for each hour in $/hour.

Some aspects of the commercial pricing node will now be described. A commercial pricing node may be specified for the ESR at the time the asset is registered. The commercial pricing node type may not be a load zone, interface, or hub.

Some aspects of the hourly charge ramp rate will now be described. An offer may include an hourly charge ramp rate, expressed for each hour in mw/minute. If no hourly charge ramp rate is submitted, the default charge ramp rate may be used. The default charge ramp rate is specified during the asset registration process and may be updated by an MP from the market portal. A single hourly charge ramp rate value may be used for an ESR to ramp up or down for energy and for regulating up or down between the corresponding maximum charge limit and zero.

Some aspects of the hourly discharge ramp rate will now be described. An offer may include an hourly discharge ramp rate, expressed for each hour in mw/minute. If no hourly discharge ramp rate is submitted, the default discharge ramp rate may be used. The default discharge ramp rate is specified during the asset registration process and may be updated by an MP from the market portal. A single hourly discharge ramp rate value may be used for an ESR to ramp up or down for energy and for regulating up or down between the corresponding maximum discharge limit and zero. When the commitment status is continuous ramp rate value would be determined based on which side of zero the resource is getting dispatched. If the ESR is being dispatched between zero and the corresponding discharge maximum limit then the discharge ramp rate is used, conversely, if the ESR is being dispatched between zero and corresponding charge maximum limit then the charge ramp rate is used for an ESR to ramp up or down for energy and for regulating up or down.

Some aspects of the hourly regulation minimum charge limit will now be described. An offer may include an hourly regulation minimum charge limit if the resource is a regulation qualified resource, expressed for each hour in MW. If no hourly regulation minimum charge limit is submitted, the default limit may be used. The default limit may be specified during the asset registration process and may be updated by the MP from the market portal. The hourly regulation minimum charge limit may be greater than or equal to hourly economic minimum charge limit, and may be less than or equal to hourly regulation maximum charge limit. When commitment status is continuous hourly regulation minimum charge limit may not be used.

Some aspects of the hourly regulation maximum charge limit will now be described. An offer may include an hourly regulation maximum charge limit if the resource is a regulation qualified resource, expressed for each hour in MW. If no hourly regulation maximum charge limit is submitted, the default limit may be used. The default limit may be specified during the asset registration process and may be updated by the MP from the market portal. The hourly regulation maximum charge limit may be less than or equal to hourly economic maximum charge limit, may be greater than or equal to hourly economic minimum charge limit, and may be greater than or equal to hourly regulation minimum charge limit.

Some aspects of the hourly regulation minimum discharge limit will now be described. An offer may include an hourly regulation minimum discharge limit if the resource is a regulation qualified resource, expressed for each hour in MW. If no hourly regulation minimum discharge limit is submitted, the default limit may be used. The default limit may be specified during the asset registration process and may be updated by the MP from the market portal. The hourly regulation minimum discharge limit may be greater than or equal to hourly economic minimum discharge limit, and may be less than or equal to hourly regulation maximum discharge limit. When commitment status is continuous hourly regulation minimum discharge limit may not be used.

Some aspects of the hourly regulation maximum discharge limit will now be described. An offer may include an hourly regulation maximum discharge limit if the resource is a regulation qualified resource, expressed for each hour in MW. If no hourly regulation maximum discharge limit is submitted, the default limit may be used. The default limit may be specified during the asset registration process and may be updated by the MP from the market portal. The hourly regulation maximum discharge limit may be less than or equal to hourly economic maximum discharge limit, may be greater than or equal to hourly economic minimum discharge limit, and may be greater than or equal to hourly regulation minimum discharge limit.

Some aspects of the hourly maximum energy storage level will now be described. An offer may include an hourly maximum energy storage level, expressed for each hour in MWh. If no hourly maximum energy storage level is submitted, the default value specified during the asset registration process may be used.

Some aspects of the hourly minimum energy storage level will now be described. An offer may include an hourly minimum energy storage level, expressed for each hour in MWh. If no hourly minimum energy storage level is submitted, the default value specified during the asset registration process may be used.

Some aspects of the hourly economic maximum charge limit will now be described. An offer may include an hourly economic maximum charge limit, expressed for each hour in MW. If no hourly economic maximum charge limit is submitted, the default value specified during the asset registration process may be used. This value may be greater than or equal to hourly economic minimum charge limit. This limit may be used as the minimum MW dispatch limit when commitment status is charge or continuous under normal operating conditions.

Some aspects of the hourly economic maximum discharge limit will now be described. An offer may include an hourly economic maximum discharge limit, expressed for each hour in MW, which may not be used to withhold a portion of the capacity of a resource from the DA energy and OR market if such capacity is designated as a capacity resource pursuant to RAR, unless such portion is unavailable due to a forced or planned outage or other physical operating restrictions. If no hourly economic maximum discharge limit is submitted, the default value specified during the asset registration process may be used. This value may be greater than or equal to hourly economic minimum discharge limit. This limit may be used as the maximum MW dispatch limit when commitment status is charge, available or continuous under normal operating conditions.

Some aspects of the hourly economic minimum charge limit will now be described. An offer may include an hourly economic minimum charge limit, expressed for each hour in MW. If no hourly economic minimum charge limit is submitted, the default value specified during the asset registration process may be used. This value may be greater than or equal to zero. This limit may be used when commitment status is charge as maximum MW dispatch limit under normal operating conditions. When commitment status is continuous this limit may not be used.

Some aspects of the hourly economic minimum discharge limit will now be described. An offer may include an hourly economic minimum discharge limit, expressed for each hour in MW. If no hourly economic minimum energy discharge limit is submitted, the default value specified during the asset registration process may be used. This value may be greater than or equal to zero. This limit may be used when commitment status is discharge or available as minimum MW dispatch limit under normal operating conditions. When commitment status is continuous this limit may not be used.

Some aspects of the hourly emergency maximum charge limit will now be described. An offer may include an hourly emergency maximum charge limit, expressed for each hour in MW. If no hourly emergency maximum charge limit is submitted, the default value specified during the asset registration process may be used. This value may be greater than or equal to hourly economic maximum charge limit. This limit may be used as the minimum MW dispatch limit when commitment status is emergency charge, charge or continuous under emergency operating conditions.

Some aspects of the hourly emergency maximum discharge limit will now be described. An offer may include an hourly emergency maximum discharge limit, expressed for each hour in MW, which may not be used to withhold a portion of the capacity of a resource from the DA energy and OR market if such capacity is designated as a capacity resource pursuant to RAR, unless such portion is unavailable due to a forced or planned outage or other physical operating restrictions. If no hourly emergency maximum discharge limit is submitted, the default value specified during the asset registration process may be used. This value may be greater than or equal to hourly economic maximum discharge limit. This limit may be used as the maximum MW dispatch limit when commitment status is emergency discharge, discharge, available or continuous under emergency operating conditions.

Some aspects of the hourly emergency minimum charge limit will now be described. An offer may include an hourly emergency minimum charge limit, expressed for each hour in MW. If no hourly emergency minimum charge limit is submitted, the default value specified during the asset registration process may be used. This value may be greater than or equal to zero. This limit may be used when commitment status is emergency charge, charge as maximum MW dispatch limit under emergency operating conditions. When commitment status is continuous this limit may not be used.

Some aspects of the hourly emergency minimum discharge limit will now be described. An offer may include an hourly emergency minimum discharge limit, expressed for each hour in MW. If no hourly emergency minimum energy discharge limit is submitted, the default value specified during the asset registration process may be used. This value may be greater than or equal to zero. This limit may be used when commitment status is emergency discharge, discharge, and/or available as minimum MW dispatch limit under normal operating conditions. When commitment status is continuous this limit may not be used.

Some aspects of the minimum and maximum discharge times will now be described. An offer may include a minimum discharge time, expressed for each day in hours. An offer may include a maximum discharge time, expressed for each day in hours.

Some aspects of the minimum down time will now be described. An offer may include a minimum down time, expressed for each day in hours.

Some aspects of the minimum and maximum charge times will now be described. An offer may include a minimum charge time, expressed for each day in hours. An offer may include a maximum charge time, expressed for each day in hours.

Some aspects of the commitment status will now be described. An offer may include specification of a commitment status for each hour. Valid commitment status specifications may include: charge, discharge, continuous, emergency, available, outage, and not participating. An available commitment status may indicate the transmission provider is authorized to commit the resource on an economic basis for the hour using offer parameters associated with commitment status of discharge. A charge, discharge, or continuous commitment status may indicate that the MP is self-committing the resource for the hour. An emergency commitment status may indicate the transmission provider is authorized to commit the resource only under an emergency condition for the hour. An outage commitment status may indicate the resource may not be available for commitment during the hour due to a planned or forced outage. A not participating commitment status may indicate the MP may not operate a resource that is otherwise available. The not participating commitment status may be available to an ESR that has all or a portion of its capacity designated as a capacity resource, but may be required to be used consistent with Module E-1 obligations.

Some aspects of the energy dispatch status will now be described. An offer may include specification of an energy dispatch status for energy for each hour. Valid energy dispatch status specifications may include: economic, self-schedule, and not participating. An economic energy dispatch status may indicate that the transmission provider is authorized to economically clear energy on the resource for the hour. A self-schedule energy dispatch status may indicate that the MP is self-scheduling energy on the resource for the hour and may follow the self-scheduling rules defined in 39.1.2. The not participating energy dispatch status may be available to an ESR that has all or a portion of its capacity designated as a capacity resource, but may be required to be used consistent with Module E-1 obligations. The energy dispatch status only applies to resources that are committed for the hour.

Some aspects of the regulating reserve dispatch status will now be described. An offer may include specification of a regulating reserve dispatch status for regulating reserve for each hour. Valid regulating reserve dispatch status specifications may include: economic, self-schedule, not qualified, and not participating. An economic regulating reserve dispatch status may indicate that the transmission provider is authorized to economically clear regulating reserve on the resource for the hour. A self-schedule regulating reserve dispatch status may indicate that the MP is self-scheduling regulating reserve on the resource for the hour. A not qualified regulating reserve dispatch status may indicate that the resource may not be qualified to provide regulating reserve for an hour. A not participating regulating reserve dispatch status may indicate the MP may not provide regulating reserve on a resource that is otherwise qualified to provide regulating reserve. The regulating reserve dispatch status only applies to resources that are (i) committed for the hour and (ii) registered as regulation qualified resources. The resource cleared or self-scheduled for regulation may not impact the energy storage level. However there should be sufficient energy storage level to clear regulating reserves or honor self-scheduled regulation for the hour.

Some aspects of the spinning reserve dispatch status will now be described. An offer may include specification of a spinning reserve dispatch status for spinning reserve for each hour. Valid spinning reserve dispatch status specifications include: economic, self-schedule and not qualified. An economic spinning reserve dispatch status may indicate that the transmission provider is authorized to economically clear spinning reserve on the resource for the hour. A self-schedule spinning reserve dispatch status may indicate that the MP is self-scheduling spinning reserve on the resource for the hour. A not qualified spinning reserve dispatch status may indicate that the resource may not be qualified to provide spinning reserve for an hour. The spinning reserve dispatch status cannot be set to not qualified for a specific resource in a specific hour unless the regulating reserve dispatch status is also set to not qualified for that resource in that hour. The resource cleared or self-scheduled for spinning reserve may not impact the energy storage level. However there should be sufficient energy storage level to clear spinning reserves or honor self-scheduled spinning reserves for the hour.

For a resource not designated as a capacity resource, an MP may be required to select a not participating commitment status pursuant to Section 39.2.5d.b.xxx of the Tariff in order to not participate in providing spinning reserve. The spinning reserve dispatch status only applies to resources that are (i) committed for the hour and (ii) are registered as spin qualified resources.

Some aspects of the on-line supplemental reserve dispatch status will now be described. An offer may include specification of an on-line supplemental reserve dispatch status for supplemental reserve for each hour. Valid on-line supplemental reserve dispatch status specifications include: economic, self-schedule and not qualified. An economic on-line supplemental reserve dispatch status may indicate that the transmission provider is authorized to economically clear supplemental reserve on the resource for the hour if the resource is committed. A self-schedule on-line supplemental reserve dispatch status may indicate that the MP is self-scheduling supplemental reserve on the resource for the hour if the resource is committed. A not qualified on-line supplemental reserve dispatch status may indicate that the resource may not be qualified to provide supplemental reserve for an hour as a committed resource. The resource cleared or self-scheduled for supplemental reserve may not impact the energy storage level. However there should be sufficient energy storage level to clear supplemental reserves or honor self-scheduled supplemental reserves for the hour.

For a resource not designated as a capacity resource, an MP may be required to select a not participating commitment status pursuant to Section 39.2.5d.b.xxx of the Tariff in order to not participate in providing on-line supplemental reserve. The on-line supplemental reserve dispatch status only applies to resources that are (i) committed for the hour, (ii) registered as supplemental qualified resources and, (iii) not registered as spin qualified resources or have been disqualified by the MP as spin qualified resources for the hour.

Some aspects of the off-line supplemental reserve dispatch status will now be described. An offer may include specification of an off-line supplemental reserve dispatch status for supplemental reserve for each hour. Valid off-line supplemental reserve dispatch status specifications include: economic, emergency, self-schedule, not qualified and not participating. An economic off-line supplemental reserve dispatch status may indicate that the transmission provider is authorized to economically clear off-line supplemental reserve on the resource for the hour when the resource's commitment status is available.

An emergency off-line supplemental reserve dispatch status may indicate that the transmission provider is authorized to economically clear off-line supplemental reserve on the resource for the hour when the resource's commitment status is available and all available resources with economic or available commitment status have been committed. A self-schedule off-line supplemental reserve dispatch status may indicate that the MP is self-scheduling off-line supplemental reserve on the resource for the hour. A not qualified off-line supplemental reserve dispatch status may indicate that the resource may not be qualified to provide off-line supplemental reserve for an hour.

A not participating off-line supplemental reserve dispatch status may indicate the MP may not provide off-line supplemental reserve on a resource that has a commitment status of available and that is otherwise qualified to provide off-line supplemental reserve. The not participating off-line supplemental reserve dispatch status may be available to an ESR that has all or a portion of its capacity designated as a capacity resource, but may be required to be used consistent with Module E-1 obligations. The off-line supplemental reserve dispatch status only applies to resources when their commitment status is available for the hour and they are registered as quick-start resources.

Some aspects of the up and down ramp capability dispatch status will now be described. An offer may include specification of an up and down ramp capability dispatch status which applies to both up ramp capability and down ramp capability for each hour. Valid up and down ramp capability dispatch status specifications include: economic and not participating. An economic up and down ramp capability dispatch status may indicate that the transmission provider is authorized to economically clear up ramp capability and/or down ramp capability on the resource for the hour. A not participating up and down ramp capability dispatch status may indicate that the resource may not be cleared to supply up ramp capability or down ramp capability for an hour.

The up and down ramp capability dispatch status only applies to resources that are (i) committed for the hour and (ii) have offered an energy dispatch status of economic for the hour.

Some aspects of the hourly electric storage efficiency factor will now be described. An offer may include specification of an hourly electric storage efficiency factor for each hour, expressed as a percentage. If no hourly electric storage efficiency factor is submitted, the default value specified during the asset registration process may be used.

Some aspects of the values in offers will now be described. The values in offers representing the non-price information identified in Section 39.2.5d.b may reflect the actual known physical capabilities and characteristics of the ESR on which the offer is based.

Some aspects of the DA energy and OR market offer price caps and floors will now be described. The following offer price caps may apply to ESRs in the DA energy and OR market: energy offer price cap: $1,000/MWh; energy offer price floor: negative $500/MWh; regulating total cost price cap: $500/MW/hour; regulating total cost price floor $0/MW/hour; contingency reserve offer price cap: $100/MW/hour; contingency reserve offer price floor: $0/MW/hour; regulating mileage offer price floor: $0/MW.

Some aspects of the electronic storage resource offer rules in the RT will now be described. For example, some aspects of the ESR offer rules in the RT energy and OR market will now be described.

MPs that intend to supply energy, OR, up ramp capability, and/or down ramp capability in the RT energy and OR market on ESRs may provide the information specified herein. In some embodiments, an ISO operating as an RC and balancing authority (BA) may have to provide reliable power and balance the system generation to meet the area load and interchange. To balance the system, the ISO may estimate or forecast the amount of future load that would occur to then deploy the resources base points (i.e., energy) to meet that future load. Due to variations in the system conditions like forecasting errors, interchange flows not following scheduled interchange base points may not be enough to balance the system. As a result, the ISO may have to deploy operating reserves (e.g., regulating and/or contingency reserves) to meet that variations. In some implementations, the system load may vary from one deployment period to another at a very fast rate and without adequate reserves for this upward or downward ramp (i.e., up and down ramp capability) causing the system to not be able respond soon enough to achieve system balance. ESR offer may be submitted in the RT energy and OR market only for registered ESRs. ESR offers may remain in effect for the RT energy and OR market until specifically superseded by subsequent ESR offers. Each MP may only submit a single ESR offer for each individual resource. MPs may submit new or revised ESR offers, including self-schedules (except for up ramp capability and down ramp capability), to the RT energy and OR market up to thirty minutes prior to the operating hour.

Some aspects of the eligibility to charge and/or discharge will now be described. ESRs may discharge (sell) or charge (purchase) energy in the RT energy and OR market if the transmission provider has certified the resource is capable of responding to five minute dispatch targets for energy and has the appropriate telemetry installed. An ESR may not (i) offer to charge and/or discharge energy, (ii) offer and/or supply OR, or (iii) offer and/or supply up ramp capability or down ramp capability unless such resource has been included in the network model. An MP's ESR may supply regulating reserve, spinning reserve, and/or supplemental reserve in the RT energy and OR market if the transmission provider has certified that the resource is a regulation qualified resource, spin qualified resource, and/or supplemental qualified resource, respectively. MPs that offer to transact RT energy, regulating reserve, spinning reserve, supplemental reserve, up ramp capability, and/or down ramp capability may provide the offer information specified below.

Some aspects of the required ESR offer components will now be described. MPs that submit ESR offers may include a discharge and/or charge energy offer curve, a regulating capacity offer and a regulating mileage offer (if a regulation qualified resource), a spinning reserve offer (if a spin qualified resource), an on-line supplemental reserve offer (if a supplemental qualified resource but not a spin qualified resource), an off-line supplemental reserve offer (if a quick-start resource), a start-up offer, a no-load offer, and an up and down ramp capability dispatch status offer. MPs may provide ESR offers for the full MW range of their operable capacity, from (i) the hourly emergency minimum charge limit to the hourly emergency maximum charge limit in charge commitment status; (ii) the hourly emergency minimum discharge limit to the hourly emergency maximum discharge limit in discharge and available commitment status; (iii) the hourly emergency maximum charge limit to the hourly emergency maximum discharge limit in continuous commitment status; and may indicate, as part of the offer, that the ESR, committed during an emergency in either emergency charge or emergency discharge. MPs may submit an ESR offer that contains zero dollar ($0) amounts for no-load and start-up offers, in which case only the charge offer curve and/or discharge offer curve, regulating capacity offer and regulating mileage offer (if applicable), spinning reserve offer (if applicable), on-line supplemental reserve offer (if applicable), off-line supplemental reserve offer (if applicable), and/or up and down ramp capability dispatch status offer may be considered by the market clearing process pursuant to Section 40.2.8. Any limits on the ESR offer covering the full energy storage capability of the resource may be required to be consistent with Module D. A single ESR offer may be submitted in the RT energy and OR market for each hour of the operating day for which the MP is willing to sell OR and/or purchase energy to charge and/or discharge to sell energy from a given resource. The transmission provider may maintain an RT energy and OR market ESR offer for each resource. These offers are standing offers and are maintained for the RT energy and OR market independent of the DA energy and OR market. These offers may be updated for a specific hour up to thirty minutes prior to the beginning of the hour. ESR offer components may be as follows.

Some aspects of the energy offer curve will now be described. The energy offer curve to either charge and/or discharge may be expressed for each hour in $/MWh and may consist of either a stepped or a piecewise linear offer curve of up to ten segments, may be monotonically increasing, and may cover the full operating including emergency range as applicable to the commitment status of the ESR.

Some aspects of the regulating capacity offer and regulating mileage offer will now be described. The regulating capacity offer may consist of either a stepped or a piecewise linear offer curve of up to three segments, may be monotonically increasing and is only applicable to regulation qualified resources expressed for each hour in $/MW/hour. The regulating mileage offer may be a single value expressed for each hour in $/MW and is only applicable to regulation qualified resources. If the regulating capacity offer is negative, then the regulating mileage offer may be required to be $0/MW. In a given hour, any resource with regulating reserve cleared in DA energy and OR market may be required to have the same RT regulating mileage offer as its DA regulating mileage offer.

Some aspects of the spinning reserve offer will now be described. The spinning reserve offer may be expressed for each hour in $/MW and may consist of either a stepped or a piecewise linear offer curve of up to three segments, may be monotonically increasing and is only applicable to spin qualified resources.

Some aspects of the on-line supplemental reserve offer will now be described. The on-line supplemental reserve offer may be expressed for each hour in $/MW/hour and may consist of either a stepped or a piecewise linear offer curve of up to three segments, may be monotonically increasing and is only applicable to supplemental qualified resources that are not spin qualified resources.

Some aspects of the off-line supplemental reserve offer will now be described. The off-line supplemental reserve offer may be expressed for each hour in $/MW and may consist of either a stepped or a piecewise linear offer curve of up to three segments, may be monotonically increasing to discharge and is only applicable to resources that are quick-start resources and have commitment status as available.

Some aspects of the start-up offer will now be described. The start-up offer may be expressed for each day in $/start. A separate start-up offer may be submitted for hot, intermediate, and cold start-up conditions.

Some aspects of the no-load offer will now be described. The no-load offer may be expressed for each hour in $/hour.

Some aspects of the commercial pricing node will now be described. A commercial pricing node may be specified for the generation resource or demand response resource—type II at the time the asset is registered. The commercial pricing node may be the same one used for the resource in the DA energy and OR market.

Some aspects of the hourly charge ramp rate will now be described. An offer may include (i) an hourly charge ramp rate expressed for each hour in MW/minute. This charge ramp rate value may be used in the RT energy and OR market, RAC and LAC process while ramping up or down for energy and for regulating up or down between corresponding maximum charge limit and zero. If no hourly charge ramp rate is submitted, the default charge ramp rate may be used. The default charge ramp rate may be specified during the asset registration process and may be updated by the MP from the market portal.

Some aspects of the hourly discharge ramp rate will now be described. An offer may include (i) an hourly discharge ramp rate expressed for each hour in MW/minute. This discharge ramp rate value may be used in the RT energy and OR market, RAC and LAC process while ramping up or down for energy and for regulating up or down between corresponding maximum discharge limit and zero. If no hourly discharge ramp rate is submitted, the default discharge ramp rate may be used. The default discharge ramp rate may be specified during the asset registration process and may be updated by the MP from the market portal. A market portal may be a system through which MPs interact with the ISO market to submit their resource bids and offers.

When the commitment status is continuous ramp rate value would be determined based on which side of zero the resource is getting dispatched. If the ESR is being dispatched between zero and the corresponding discharge maximum limit then the discharge ramp rate may be used, conversely, if the ESR is being dispatched between zero and corresponding charge maximum limit then the charge ramp rate may be used for an ESR to ramp up or down for energy and for regulating up or down.

Some aspects of the hourly regulation minimum charge limit will now be described. An offer may include an hourly regulation minimum charge limit if the resource is a regulation qualified resource, expressed for each hour in MW. If no hourly regulation minimum charge limit is submitted, the default limit may be used. The default limit may be specified during the asset registration process and may be updated by the MP from the market portal. The hourly regulation minimum charge limit may be greater than or equal to hourly economic minimum charge limit, and may be less than or equal to hourly regulation maximum charge limit. When commitment status is continuous hourly regulation minimum charge limit may not be used.

Some aspects of the hourly regulation maximum charge limit will now be described. An offer may include an hourly regulation maximum charge limit if the resource is a regulation qualified resource, expressed for each hour in MW. If no hourly regulation maximum charge limit is submitted, the default limit may be used. The default limit may be specified during the asset registration process and may be updated by the MP from the market portal. The hourly regulation maximum charge limit may be less than or equal to hourly economic maximum charge limit, may be greater than or equal to hourly economic minimum charge limit, and may be greater than or equal to hourly regulation minimum charge limit.

Some aspects of the hourly regulation minimum discharge limit will now be described. An offer may include an hourly regulation minimum discharge limit if the resource is a regulation qualified resource, expressed for each hour in MW. If no hourly regulation minimum discharge limit is submitted, the default limit may be used. The default limit may be specified during the asset registration process and may be updated by the MP from the market portal. The hourly regulation minimum discharge limit may be greater than or equal to hourly economic minimum discharge limit, and may be less than or equal to hourly regulation maximum discharge limit. When commitment status is continuous hourly regulation minimum discharge limit may not be used.

Some aspects of the hourly regulation maximum discharge limit will now be described. An offer may include an hourly regulation maximum discharge limit if the resource is a regulation qualified resource, expressed for each hour in MW. If no hourly regulation maximum discharge limit is submitted, the default limit may be used. The default limit may be specified during the asset registration process and may be updated by the MP from the market portal. The hourly regulation maximum discharge limit may be less than or equal to hourly economic maximum discharge limit, may be greater than or equal to hourly economic minimum discharge limit, and may be greater than or equal to hourly regulation minimum discharge limit.

Some aspects of the hourly maximum energy storage level will now be described. An offer may include an hourly maximum energy storage level, expressed for each hour in MWh. If no hourly maximum energy storage level is submitted, the default value specified during the asset registration process may be used.

Some aspects of the hourly minimum energy storage level will now be described. An offer may include an hourly minimum energy storage level, expressed for each hour in MWh. If no hourly minimum energy storage level is submitted, the default value specified during the asset registration process may be used.

Some aspects of the hourly economic maximum charge limit will now be described. An offer may include an hourly economic maximum charge limit, expressed for each hour in MW. If no hourly economic maximum charge limit is submitted, the default value specified during the asset registration process may be used. This value may be greater than or equal to hourly economic minimum charge limit. This limit may be used as the minimum MW dispatch limit when commitment status is charge or continuous under normal operating conditions.

Some aspects of the hourly economic maximum discharge limit will now be described. An offer may include an hourly economic maximum discharge limit, expressed for each hour in MW, which may not be used to withhold a portion of the capacity of a resource from the RT energy and OR market if such capacity is designated as a capacity resource pursuant to RAR, unless such portion is unavailable due to a forced or planned outage or other physical operating restrictions. If no hourly economic maximum discharge limit is submitted, the default value specified during the asset registration process may be used. This value may be greater than or equal to hourly economic minimum discharge limit. This limit may be used as the maximum MW dispatch limit when commitment status is discharge, available or continuous under normal operating conditions.

Some aspects of the hourly economic minimum charge limit will now be described. An offer may include an hourly economic minimum charge limit, expressed for each hour in MW. If no hourly economic minimum charge limit is submitted, the default value specified during the asset registration process may be used. This value may be greater than or equal to zero. This limit may be used when commitment status is charge as maximum MW dispatch limit under normal operating conditions. When commitment status is continuous this limit may not be used.

Some aspects of the hourly economic minimum discharge limit will now be described. An offer may include an hourly economic minimum discharge limit, expressed for each hour in MW. If no hourly economic minimum discharge limit is submitted, the default value specified during the asset registration process may be used. This value may be greater than or equal to zero. This limit may be used when commitment status is discharge or available as minimum MW dispatch limit under normal operating conditions. When commitment status is continuous this limit may not be used.

Some aspects of the hourly emergency maximum charge limit will now be described. An offer may include an hourly emergency maximum charge limit, expressed for each hour in MW. If no hourly emergency maximum charge limit is submitted, the default value specified during the asset registration process may be used. This value may be greater than or equal to hourly economic maximum charge limit. This limit may be used as the minimum MW dispatch limit when commitment status is emergency charge, charge or continuous under emergency operating conditions.

Some aspects of the hourly emergency maximum discharge limit will now be described. An offer may include an hourly emergency maximum discharge limit, expressed for each hour in MW, which may not be used to withhold a portion of the capacity of a resource from the RT energy and OR market if such capacity is designated as a capacity resource pursuant to RAR, unless such portion is unavailable due to a forced or planned outage or other physical operating restrictions. If no hourly emergency maximum discharge limit is submitted, the default value specified during the asset registration process may be used. This value may be greater than or equal to hourly economic maximum discharge limit. This limit may be used as the maximum MW dispatch limit when commitment status is emergency discharge, discharge, available or continuous under emergency operating conditions.

Some aspects of the hourly emergency minimum charge limit will now be described. An offer may include an hourly emergency minimum charge limit, expressed for each hour in MW. If no hourly emergency minimum charge limit is submitted, the default value specified during the asset registration process may be used. This value may be greater than or equal to zero. This limit may be used when commitment status is emergency charge, charge as maximum MW dispatch limit under emergency operating conditions. When commitment status is continuous this limit may not be used.

Some aspects of the hourly emergency minimum discharge limit will now be described. An offer may include an hourly emergency minimum discharge limit, expressed for each hour in MW. If no hourly emergency minimum energy discharge limit is submitted, the default value specified during the asset registration process may be used. This value may be greater than or equal to zero. This limit may be used when commitment status is emergency discharge, discharge, and/or available as minimum MW dispatch limit under normal operating conditions. When commitment status is continuous this limit may not be used.

Some aspects of the hourly electric storage efficiency factor will now be described. An offer may include specification of an hourly electric storage efficiency factor for each hour, expressed as a percentage. If no hourly electric storage efficiency factor is submitted, the default value specified during the asset registration process may be used.

Some aspects of the minimum and maximum discharge times will now be described. An offer may include a minimum discharge time, expressed for each day in hours. An offer may include a maximum discharge time, expressed for each day in hours.

Some aspects of the minimum down time will now be described. An offer may include a minimum down time, expressed for each day in hours.

Some aspects of the minimum and maximum charge times will now be described. An offer may include a minimum charge time, expressed for each day in hours. An offer may include a maximum charge time, expressed for each day in hours.

Some aspects of the maximum off-line response limit will now be described. An offer may include a maximum off-line response limit, expressed for each hour in MW. This requirement applies to quick-start resources only. If no hourly maximum off-line response limit is submitted, the default maximum off-line response limit may be used. The default maximum off-line response limit is specified during the asset registration process and may be updated by the MP from the market portal.

Some aspects of the commitment status will now be described. An offer may include specification of a commitment status. Valid commitment status specifications include: charge, discharge, continuous, emergency, available, outage and not participating. An available commitment status may indicate the transmission provider is authorized to commit the resource on an economic basis for the hour using offer parameters associated with commitment status of discharge. A charge, discharge, or continuous commitment status may indicate that the MP is self-committing the resource for the hour. An emergency commitment status may indicate the transmission provider is authorized to commit the resource only under an emergency condition for the hour. An outage commitment status may indicate the resource may not be available for commitment during the hour due to a planned or forced outage. A not participating commitment status may indicate that the MP may not operate a resource that is otherwise available. The not participating commitment status may be available to an ESR that has all or a portion of its capacity designated as a capacity resource, but may be required to be used consistent with Module E-1 obligations.

Some aspects of the energy dispatch status will now be described. An offer may include specification of an energy dispatch status for energy. Valid energy dispatch status specifications include: economic, self-schedule, and not participating. An economic energy dispatch status may indicate that the transmission provider is authorized to economically clear energy on the resource for the hour. A self-schedule energy dispatch status may indicate that the MP is self-scheduling energy on the resource for the hour and may follow the self-scheduling rules defined in 39.1.2. The not participating energy dispatch status may be available to an ESR that has all or a portion of its capacity designated as a capacity resource, but may be required to be used consistent with Module E-1 obligations. The energy dispatch status only applies to resources that are committed for the hour.

Some aspects of the regulating reserve dispatch status will now be described. An offer may include specification of a regulating reserve dispatch status for regulating reserve. Valid regulating reserve dispatch status specifications include: economic, self-schedule, not qualified and not participating. An economic regulating reserve dispatch status may indicate that the transmission provider is authorized to economically clear regulating reserve on the resource for the hour. A self-schedule regulating reserve dispatch status may indicate that the MP is self-scheduling regulating reserve on the resource for the hour. A not qualified regulating reserve dispatch status may indicate that the resource may not be qualified to provide regulating reserve for an hour. A not participating regulating reserve dispatch status may indicate the MP may not provide regulating reserve on a resource that is otherwise qualified to provide regulating reserve. The regulating reserve dispatch status only applies to resources that are (i) committed for the hour and (ii) registered as regulation qualified resources. The resource should have sufficient energy storage level to clear regulating reserves or honor self-scheduled regulation volume for the hour.

Some aspects of the spinning reserve dispatch status will now be described. An offer may include specification of a spinning reserve dispatch status for spinning reserve. Valid spinning reserve dispatch status specifications include: economic, self-schedule and not qualified. An economic spinning reserve dispatch status may indicate that the transmission provider is authorized to economically clear spinning reserve on the resource for the hour. A self-schedule spinning reserve dispatch status may indicate that the MP is self-scheduling spinning reserve on the resource for the hour. A not qualified spinning reserve dispatch status may indicate that the resource may not be qualified to provide spinning reserve for an hour. The spinning reserve dispatch status cannot be set to not qualified for a specific resource in a specific hour unless the regulating reserve dispatch status is also set to not qualified for that resource in that hour. The resource should have sufficient energy storage level to clear spinning reserves or honor self-scheduled spinning reserves volume for the hour.

For a resource not designated as a capacity resource, an MP may be required to select a not participating commitment status pursuant to Section 40.2.7c.b.xxxiii of the Tariff in order to not participate in providing spinning reserve. The spinning reserve dispatch status only applies to resources that are (i) committed for the hour and (ii) are registered as spin qualified resources.

Some aspects of the on-line supplemental reserve dispatch status will now be described. An offer may include specification of an on-line supplemental reserve dispatch status for supplemental reserve. Valid on-line supplemental reserve dispatch status specifications include: economic, self-schedule and not qualified. An economic on-line supplemental reserve dispatch status may indicate that the transmission provider is authorized to economically clear supplemental reserve on the resource for the hour if the resource is committed. A self-schedule on-line supplemental reserve dispatch status may indicate that the MP is self-scheduling supplemental reserve on the resource for the hour if the resource is committed. A not qualified on-line supplemental reserve dispatch status may indicate that the resource may not be qualified to provide supplemental reserve for an hour as a committed resource. The resource should have sufficient energy storage level to clear supplemental reserves or honor self-scheduled supplemental reserves for the hour.

For a resource not designated as a capacity resource, an MP may be required to select a not participating commitment status pursuant to Section 40.2.7b.b.xxxiii of the Tariff in order to not participate in providing on-line supplemental reserve. The on-line supplemental reserve dispatch status only applies to resources that are (i) committed for the hour, (ii) registered as supplemental qualified resources and, (iii) not registered as spin qualified resources or have been disqualified by the MP as spin qualified resources for the hour.

Some aspects of the off-line supplemental reserve dispatch status will now be described. An offer may include specification of an off-line supplemental reserve dispatch status for supplemental reserve. Valid off-line supplemental reserve dispatch status specifications include: economic, emergency, self-schedule, not qualified and not participating. An economic off-line supplemental reserve dispatch status may indicate that the transmission provider is authorized to economically clear off-line supplemental reserve on the resource for the hour when the resource's commitment status is available.

An emergency off-line supplemental reserve dispatch status may indicate that the transmission provider is authorized to economically clear off-line supplemental reserve on the resource for the hour when the resource's commitment status is available and all available resources with economic or available commitment status have been committed. A self-schedule off-line supplemental reserve dispatch status may indicate that the MP is self-scheduling off-line supplemental reserve on the resource for the hour. A not qualified off-line supplemental reserve dispatch status may indicate that the resource may not be qualified to provide off-line supplemental reserve for an hour.

A not participating off-line supplemental reserve dispatch status may indicate the MP may not provide off-line supplemental reserve on a resource that has a commitment status of available and that is otherwise qualified to provide off-line supplemental reserve. The not participating off-line supplemental reserve dispatch status may be available to an ESR that has all or a portion of its capacity designated as a capacity resource, but may be required to be used consistent with Module E-1 obligations. The off-line supplemental reserve dispatch status only applies to resources when their commitment status is available for the hour and they are registered as quick-start resources.

Some aspects of the up and down ramp capability dispatch status will now be described. An offer may include specification of an up and down ramp capability dispatch status which applies to both up ramp capability and down ramp capability. Valid up and down ramp capability dispatch status specifications include: economic and not participating. An economic up and down ramp capability dispatch status may indicate that the transmission provider is authorized to economically clear up ramp capability and/or down ramp capability on the resource for the hour. A not participating up and down ramp capability dispatch status may indicate that the resource may not be cleared to supply up ramp capability or down ramp capability for an hour.

Some aspects of the ramp rate curves will now be described. An MP may specify a charge ramp rate curve and discharge ramp rate curve for use in the RT energy and OR market and each curve may include up to ten linear segments. Such ramp rate curves may be updated for a specific hour no less than thirty minutes prior to the beginning of the hour. The participant may activate the use of such ramp rate curves for a specific hour no less than thirty minutes prior to the beginning of the hour. If activated, such ramp rate curves may be used in lieu of the hourly charge ramp rate and/or the hourly discharge ramp rate for a specific resource during a specific hour in the RT energy and OR market. When the commitment status is continuous ramp rate curve would be determined based on which side of zero the resource is getting dispatched. If the ESR is being dispatched between zero and the corresponding discharge maximum limit then the discharge ramp rate curve is used, conversely, if the ESR is being dispatched between zero and corresponding charge maximum limit then the charge ramp rate curve is used for an ESR to ramp up or down for energy and for regulating up or down.

Some aspects of the limit and ramp rate priority will now be described. Default operating limits for resources provided to the transmission provider during asset registration and may be overridden by hourly resource limits (limits applicable to an operating hour). Furthermore, hourly limits may be overridden as necessary within an hour by the transmission provider at the request of the MP to reflect RT changes in the operational capabilities associated with ESRs. Default charge and discharge ramp rate for ESRs provided to the transmission provider during asset registration may be overridden by hourly charge and discharge ramp rate and hourly charge and discharge ramp rate may be overridden by charge and discharge ramp rate curve. Furthermore, all charge and discharge ramp rates may be overridden as necessary by the transmission provider at the request of the MP within an hour to reflect changes in the operational capabilities associated with ESRs. All specified resource limits, ramp rates and other physical operating parameters may be subject to investigation by the independent market monitor pursuant to provisions set forth in Module D.

Some aspects of the values in offers will now be described. The values in offers representing the non-price information identified in Section 40.2.7C.b reflect the actual known physical capabilities and characteristics of the ESR on which the offer is based.

Some aspects of the RT energy and OR market offer price caps and floors will now be described. The following offer price caps may apply to ESRs in the RT energy and OR market: energy offer price cap: $1,000/MWh; energy offer price floor: negative $500/MWh; regulating total cost price cap: $500/MW/hour; regulating total cost price floor: $0/MW/hour; contingency reserve offer price cap: $100/MW/hour; contingency reserve offer price floor: $0/MW/hour; regulating mileage offer price floor: $0/MW.

Some aspects of the self-scheduled resources will now be described. MPs may submit self-schedules for energy and/or operating reserve from their resources other than ESRs, in whole or in part, in the RT energy and OR market. MPs that submit self-schedules for energy may be required to submit a MW quantity and the applicable time period for each self-scheduled resource.

MPs that submit self-schedules for OR may be required to submit a MW quantity and the applicable time period for each self-scheduled resource. MPs that submit self-schedules for energy and/or OR may be price takers for each self-schedule. Self-schedules for energy may be required to be greater than or equal to the hourly economic minimum limit and less than or equal to the hourly economic maximum limit, or the forecast maximum limit. In the event that the forecast maximum limit is less than the self-schedule for energy, the self-schedule for energy may be set equal to the forecast maximum limit. Self-schedules for regulating reserve may be required to be greater than or equal to 1 MW for each self-scheduled resource and may only be submitted for regulation qualified resources. Self-schedules for spinning reserve may be required to be greater than or equal to 1 MW for each self-scheduled resource and may only be submitted for spin qualified resources. Self-schedules for supplemental reserve may be required to be greater than or equal to 1 MW for each self-scheduled resource and may only be submitted for supplemental qualified resources that are not also spin qualified resources. The acceptance of self-schedules for a specific self-scheduled resource may be contingent on (i) the on-line status of the self-scheduled resource, and (ii) compliance with the corresponding self-scheduled resource limit and ramping constraints as set forth in Schedule 29. If a self-schedule is accepted by the transmission provider, the resource schedules for energy and OR may clear above the self-scheduled amounts based on the submitted offers, as needed, in an economic manner based upon the simultaneously co-optimized solution. The transmission provider may reduce self-schedules as necessary to manage transmission constraints, maintain OR requirements, satisfy energy demand and/or maintain reliable operating conditions. In no case will the transmission provider violate the resource limits. Stored energy resources cannot self-schedule regulating reserve in the RT energy and OR market.

MPs may submit self-schedules for energy and/or OR from their ESRs, in whole or in part, in the RT energy and OR market. MPs that submit self-schedules for energy may be required to submit a MW quantity and the applicable hour for each self-scheduled resource. MPs that submit self-schedules for OR may be required to submit a MW quantity and the applicable hour for each self-scheduled resource. MPs that submit self-schedules for energy and/or OR may be price takers for each self-schedule. Self-schedules for energy may be required to be: (i) greater than or equal to the hourly economic discharge minimum limit and less than or equal to hourly economic discharge maximum limit in discharge commitment mode; (ii) greater than or equal to the negative of hourly economic charge maximum limit and less than or equal to negative of hourly economic charge minimum limit in charge commitment mode; (iii) greater than or equal to negative of hourly economic charge maximum limit and less than or equal to hourly economic discharge maximum limit in continuous commitment mode. Self-schedules for regulating reserve may only be submitted for regulation qualified resources. Self-schedules for spinning reserve may only be submitted for spin qualified resources. Self-schedules for supplemental reserve may only be submitted for supplemental qualified resources that are not also spin qualified resources or for supplemental qualified resources that are quick start resources that are in available commitment mode. The acceptance of self-schedules for a specific self-scheduled resource may be contingent on compliance with the corresponding self-scheduled resource limit and ramping constraints as set forth in Schedule 29. If a self-schedule is accepted by the transmission provider, the resource schedules for energy and OR may clear above the self-scheduled amounts based on the submitted offers, as needed, in an economic manner based upon the simultaneously co-optimized solution and with the following rules: (i) if the self-schedule amount is greater than zero then MW amount above this value could be economically dispatched; (ii) if the self-schedule amount is less than zero then MW amount below this value could be economically dispatched; (iii) if the self-schedule amount is equal to zero then self-schedule offer may be ignored. The transmission provider may reduce self-schedules as necessary to manage transmission constraints, maintain OR requirements, satisfy energy demand and/or maintain reliable operating conditions. In no case will the transmission provider violate the resource limits.

MPs may not submit self-schedules for up ramp capability and/or down ramp capability from their resources in the RT energy and OR market.

In some embodiments, an electrical power grid, including an electrical power grid, a plurality of power generation participants providing electrical power to the electrical power grid, a plurality of consumers drawing electrical power from the electrical power grid, and a plurality of ESRs accessible to and from the electrical power grid, may be operated. For example, the operations may comprise: managing, via the power generation participants, (i) a state of charge (SOC) for the ESRs, (ii) at least one operational constraint, (iii) minimum and maximum offer parameters, (iv) minimum and maximum SOCs, and (v) transition times between charging and discharging, wherein the parameters include charge or discharge time and charge or discharge limits; treating at least three, different online modes as a must run commitment status, wherein the at least three online modes include discharging, charging, and continuous; and committing an ESR offering an emergency discharge commitment status or an emergency charge commitment status to address a maximum generation emergency condition or a minimum generation emergency condition, respectively. In some embodiments, a system performs, via the electrical power grid, at least some of the foregoing operations.

In some embodiments, at least one of the ESRs may implement new, storage-specific offer parameters and operating characteristics required by FERC Order 841. In these or other embodiments, the at least one ESR may provide eight operating modes to facilitate SOC management and commercial operations indicated via an ESR offer parameter, specifically the commitment status.

In some embodiments, valid commitment statuses may include discharge, emergency discharge, charge, emergency charge, continuous, available, not participating, and offline.

In some embodiments, operating the electrical power grid may comprise: managing, via the power generation participants, (i) a state of charge (SOC) for the ESRs, (ii) at least one operational constraint, (iii) minimum and maximum offer parameters, (iv) minimum and maximum SOCs, and (v) transition times between charging and discharging, wherein the parameters include charge or discharge time and charge or discharge limits; treating at least three, different online modes as a must run commitment status, wherein the at least three online modes include discharging, charging, and continuous; and providing availability of offline supplemental qualified ESRs offering an available commitment status to provide offline supplemental and to be called upon for commitment in discharge mode in response to a contingency reserve event.

Techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques may be performed by one or more programmable processors executing a computer program to perform functions of the techniques by operating on input data and generating output. Method steps may also be performed by, and apparatus of the techniques may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory may be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. A computer-implemented method for operating an electrical power grid including an electrical power grid, a plurality of power generation participants providing electrical power to the electrical power grid, a plurality of consumers drawing electrical power from the electrical power grid, and a plurality of electric storage resources (ESRs) accessible to and from the electrical power grid, comprising:
    managing, via the power generation participants, (i) a state of charge (SOC) for the ESRs, (ii) at least one operational constraint, (iii) minimum and maximum offer parameters, (iv) minimum and maximum SOCs, and (v) transition times between charging and discharging, wherein the parameters include charge or discharge time and charge or discharge limits;
    treating at least three, different online modes as a must run commitment status, wherein the at least three online modes include discharging, charging, and continuous; and
    committing an ESR offering an emergency discharge commitment status or an emergency charge commitment status to address a maximum generation emergency condition or a minimum generation emergency condition, respectively.

2. The method of claim 1, further comprising:
    implementing, via at least one of the ESRs, new, storage-specific offer parameters and operating characteristics required by Federal Energy Regulatory Commission (FERC) Order 841; and
    providing, via the at least one ESR, eight operating modes to facilitate SOC management and commercial operations indicated via an ESR offer parameter, specifically the commitment status.

3. The method of claim 1, wherein valid commitment statuses include discharge, emergency discharge, charge, emergency charge, continuous, available, not participating, and offline.

4. A computer-implemented method for operating an electrical power grid including an electrical power grid, a plurality of power generation participants providing electrical power to the electrical power grid, a plurality of consumers drawing electrical power from the electrical power grid, and a plurality of electric storage resources (ESRs) accessible to and from the electrical power grid, comprising:
    managing, via the power generation participants, (i) a state of charge (SOC) for the ESRs, (ii) at least one operational constraint, (iii) minimum and maximum offer parameters, (iv) minimum and maximum SOCs, and (v) transition times between charging and discharging, wherein the parameters include charge or discharge time and charge or discharge limits;
    treating at least three, different online modes as a must run commitment status, wherein the at least three online modes include discharging, charging, and continuous; and
    providing availability of offline supplemental qualified ESRs offering an available commitment status to provide offline supplemental and to be called upon for commitment in discharge mode in response to a contingency reserve event.

5. The method of claim 4, further comprising:
    implementing, via at least one of the ESRs, new, storage-specific offer parameters and operating characteristics required by federal energy regulatory commission (FERC) order 841; and
    providing, via the at least one ESR, eight operating modes to facilitate SOC management and commercial operations indicated via an ESR offer parameter, specifically the commitment status.

6. The method of claim 4, wherein valid commitment statuses include discharge, emergency discharge, charge, emergency charge, continuous, available, not participating, and offline.

7. A system for operating an electrical power grid including an electrical power grid, a plurality of power generation participants providing electrical power to the electrical power grid, a plurality of consumers drawing electrical power from the electrical power grid, and a plurality of electric storage resources (ESRs) accessible to and from the electrical power grid, comprising:
    one or more processors; and
    a computer readable medium having executable instructions stored thereon such that the one or more processors, in response to execution of the instructions, are operative to:
        manage, via the power generation participants, (i) a state of charge (SOC) for the ESRs, (ii) at least one operational constraint, (iii) minimum and maximum offer parameters, (iv) minimum and maximum SOCs, and (v) transition times between charging and discharging, wherein the parameters include charge or discharge time and charge or discharge limits;
        treat at least three, different online modes as a must run commitment status, wherein the at least three online modes include discharging, charging, and continuous; and commit an ESR offering an emergency discharge commitment status or an emergency charge commitment status to address a maximum generation emergency condition or a minimum generation emergency condition, respectively.

8. The system of claim 7, wherein the one or more processors are further operative to:

implement, via at least one of the ESRs, new, storage-specific offer parameters and operating characteristics required by federal energy regulatory commission (FERC) order 841; and provide, via the at least one ESR, eight operating modes to facilitate SOC management and commercial operations indicated via an ESR offer parameter, specifically the commitment status.

9. The system of claim 7, wherein valid commitment statuses include discharge, emergency discharge, charge, emergency charge, continuous, available, not participating, and offline.

* * * * *